US011833781B2

(12) United States Patent
Ogiwara et al.

(10) Patent No.: US 11,833,781 B2
(45) Date of Patent: Dec. 5, 2023

(54) POWER STORAGE DEVICE PACKAGING MATERIAL

(71) Applicant: TOPPAN PRINTING CO., LTD., Tokyo (JP)

(72) Inventors: Yu Ogiwara, Tokyo (JP); Junya Imamoto, Tokyo (JP); Masayoshi Suzuta, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 35 days.

(21) Appl. No.: 16/206,532

(22) Filed: Nov. 30, 2018

(65) Prior Publication Data
US 2019/0143646 A1 May 16, 2019

Related U.S. Application Data

(63) Continuation of application No. PCT/JP2017/020278, filed on May 31, 2017.

(30) Foreign Application Priority Data

Jun. 2, 2016 (JP) ................................. 2016-111009

(51) Int. Cl.
*B32B 27/32* (2006.01)
*B32B 15/085* (2006.01)
(Continued)

(52) U.S. Cl.
CPC .............. *B32B 15/085* (2013.01); *B32B 7/12* (2013.01); *B32B 15/08* (2013.01); *B32B 15/088* (2013.01);
(Continued)

(58) Field of Classification Search
CPC ..... B32B 15/08; B32B 15/085; B32B 15/088; B32B 15/09; B32B 2255/06;
(Continued)

(56) References Cited

U.S. PATENT DOCUMENTS

2002/0010284 A1* 1/2002 Nishiguchi ........ C08G 18/4081
525/403
2003/0092818 A1* 5/2003 Matsuda ............... C08L 53/025
524/451
(Continued)

FOREIGN PATENT DOCUMENTS

EP 2 779 266 A1 9/2014
JP 2001322666 A * 11/2001
(Continued)

OTHER PUBLICATIONS

Machine translation of JP-2011144356-A, retrieved Aug. 17, 2020. (Year: 2011).*
(Continued)

*Primary Examiner* — Callie E Shosho
*Assistant Examiner* — Krupa Shukla
(74) *Attorney, Agent, or Firm* — Foley & Lardner LLP

(57) ABSTRACT

A power storage device packaging material includes at least a substrate layer, a metal foil layer having an anticorrosion treatment layer on one or both sides thereof, and a sealant layer in this order. In the packaging material, the sealant layer includes a propylene-based branched polymer-containing layer that contains a propylene-based branched polymer having branched chains.

10 Claims, 7 Drawing Sheets

(51) Int. Cl.
| | |
|---|---|
| *B32B 15/08* | (2006.01) |
| *H01G 11/78* | (2013.01) |
| *B32B 27/08* | (2006.01) |
| *H01M 50/124* | (2021.01) |
| *H01M 50/105* | (2021.01) |
| *H01M 50/117* | (2021.01) |
| *H01M 50/145* | (2021.01) |
| *H01M 50/119* | (2021.01) |
| *H01M 50/121* | (2021.01) |
| *H01M 50/122* | (2021.01) |
| *H01M 50/126* | (2021.01) |
| *H01M 50/197* | (2021.01) |
| *H01M 50/193* | (2021.01) |
| *H01M 50/186* | (2021.01) |
| *B32B 7/12* | (2006.01) |
| *B32B 15/088* | (2006.01) |
| *B32B 15/09* | (2006.01) |

(52) U.S. Cl.
CPC ............ *B32B 15/09* (2013.01); *B32B 27/08* (2013.01); *B32B 27/32* (2013.01); *H01G 11/78* (2013.01); *H01M 50/105* (2021.01); *H01M 50/117* (2021.01); *H01M 50/119* (2021.01); *H01M 50/121* (2021.01); *H01M 50/122* (2021.01); *H01M 50/124* (2021.01); *H01M 50/126* (2021.01); *H01M 50/145* (2021.01); *H01M 50/186* (2021.01); *H01M 50/193* (2021.01); *H01M 50/197* (2021.01); *B32B 2255/06* (2013.01); *B32B 2255/20* (2013.01); *B32B 2255/26* (2013.01); *B32B 2307/304* (2013.01); *B32B 2307/31* (2013.01); *B32B 2307/714* (2013.01); *B32B 2307/752* (2013.01); *B32B 2439/40* (2013.01); *B32B 2457/10* (2013.01); *B32B 2553/00* (2013.01); *Y02E 60/13* (2013.01)

(58) Field of Classification Search
CPC ............ B32B 2255/20; B32B 2255/26; B32B 2307/304; B32B 2307/31; B32B 2307/714; B32B 2307/752; B32B 2439/40; B32B 2457/10; B32B 2553/00; B32B 27/08; B32B 27/32; B32B 7/12
See application file for complete search history.

(56) References Cited

U.S. PATENT DOCUMENTS

| | | | | |
|---|---|---|---|---|
| 2007/0161747 A1* | 7/2007 | Maier | .................. | C08L 23/142 525/191 |
| 2008/0023215 A1* | 1/2008 | Uehara | .................. | C08L 23/10 524/424 |
| 2009/0023826 A1* | 1/2009 | Nishimura | .............. | B32B 27/32 521/139 |
| 2009/0226728 A1* | 9/2009 | Onoe | ....................... | C09D 5/02 524/505 |
| 2009/0258243 A1* | 10/2009 | Maruyama | .............. | C08L 23/12 428/523 |
| 2010/0255365 A1* | 10/2010 | Suzuta | ................. | H01M 50/116 429/163 |
| 2011/0212361 A1* | 9/2011 | Kim | ........................ | B32B 15/20 429/176 |
| 2012/0242333 A1* | 9/2012 | Eshold | ............... | G01R 31/2863 324/228 |
| 2013/0109806 A1* | 5/2013 | Schaefer | .............. | C08G 18/022 524/710 |
| 2014/0318616 A1* | 10/2014 | Okuyama | ............... | B32B 27/20 136/256 |
| 2015/0380692 A1* | 12/2015 | Ojiri | | |
| 2016/0365545 A1* | 12/2016 | Takahagi | ............ | H01M 50/124 |
| 2017/0018744 A1 | 1/2017 | Ogihara et al. | | |

FOREIGN PATENT DOCUMENTS

| | | | | | |
|---|---|---|---|---|---|
| JP | | 2002-245983 | A | | 8/2002 |
| JP | | 2003-011275 | A | | 1/2003 |
| JP | | 2011144356 | A | * | 7/2011 |
| JP | | 2014-055254 | A | | 3/2014 |
| JP | | 2014175216 | A | * | 9/2014 |
| JP | | 2014-238978 | A | | 12/2014 |
| JP | | 2015-098558 | A | | 5/2015 |
| WO | WO | 2014-123164 | A | | 8/2014 |
| WO | | WO-2015099144 | A1 | * | 7/2015 ............. B32B 27/18 |
| WO | | WO-2015/152397 | A1 | | 10/2015 |
| WO | | WO-2016199754 | A1 | * | 12/2016 ............... B32B 7/12 |

OTHER PUBLICATIONS

Arjmand, "Investigation of Spatial Configuration of Polypropylene and the influence of Molecular Weight Distribution, Catalyst type and Tacticity on mechanical, Thermal and optical properties of polymers", IOSR Journal of Polymer and Textile Engineering, vol. 1, 2014, pp. 37-45. (Year: 2014).*
Machine translation of WO-2015099144-A1, retrieved Aug. 17, 2020. (Year: 2015).*
Machine translation of WO-2016199754-A1, retrieved Jan. 14, 2022. (Year: 2016).*
Machine translation of JP-2014175216-A, retrieved Jan. 14, 2022. (Year: 2014).*
Machine translation of JP-2001322666-A, retrieved Aug. 23, 2022. (Year: 2001).*
International Search Report regarding PCT/JP2017/020278, dated Jul. 11, 2017, 2 pps.
Extended European Search Report dated May 2, 2019 in corresponding application No. 17806735.1.
Office Action dated Mar. 2, 2021 for corresponding Japanese Patent Application No. 2016-111009.
Office Action dated Oct. 28, 2021 for corresponding Chinese Patent Application No. 201780033915.4, (12 pages).
Xiaodan, "Modification and application of polypropylene", Science and Technology Project, 2013, pp. 77-80, with English-language machine translation.
Keiichi Hamaguchi, "Laminated film processing technology," first published by Nippco., Ltd., dated Apr. 12, 1990, pp. 234-237.
"Submission of Publication," submitted to the Japanese Patent Office in connection with Japanese Patent Application No. 2022-000466, on Feb. 28, 2023.

* cited by examiner

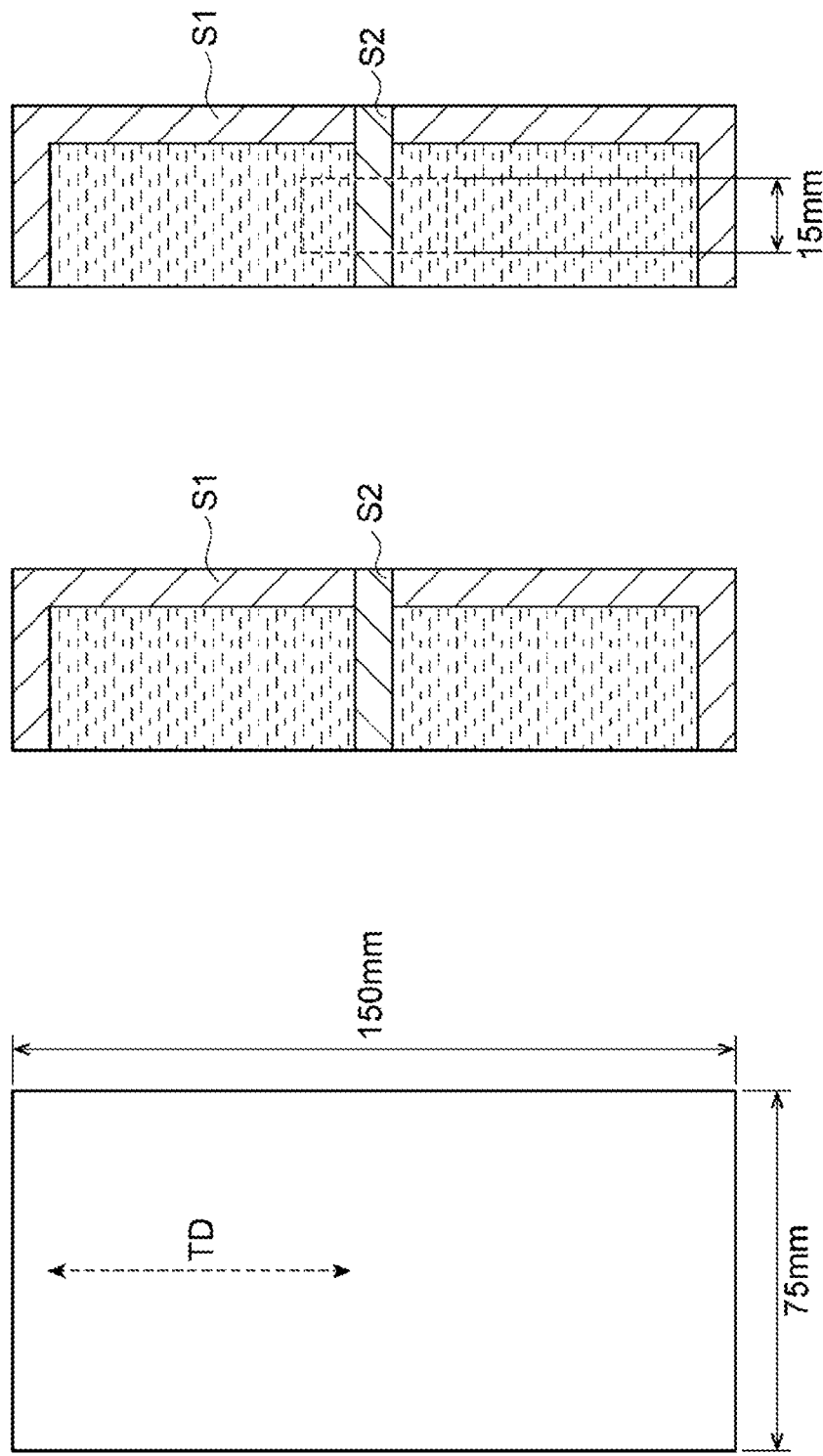

LIQUID INJECTED

25V APPLIED

POWER STORAGE DEVICE PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/020278, filed on May 31, 2017, which is based upon and claims the benefit of priority to Japanese Patent Application No. 2016-111009, filed on Jun. 2, 2016, the disclosures of which are all hereby incorporated herein by reference in their entireties.

TECHNICAL FIELD

The present invention relates to a power storage device packaging material.

BACKGROUND ART

Known power storage devices include secondary batteries, such as lithium ion batteries, nickel hydride batteries, and lead batteries, and electrochemical capacitors, such as electric double layer capacitors. Due to miniaturization of mobile devices, limitation of installation spaces, or the like, further miniaturization of power storage devices is sought, and thus attention is given to lithium ion batteries for their high energy density.

Metal cans that have been used for packaging materials for lithium ion batteries are being replaced by multilayer films (e.g., films having a configuration of substrate layer/metal foil layer/sealant layer) due to their light weight, high heat dissipation, and low manufacturing cost. As lithium ion batteries adopting such a configuration, for example, embossed lithium ion batteries are known. Such embossed lithium ion batteries are obtained by forming a recess in part of the packaging material by cold forming to accommodate the battery contents in the recess, and turning up the remaining part of the packaging material to seal the edge portion by heat sealing.

Recently, as electronic devices, such as smartphones and tablet PCs, become thinner and larger, batteries installed in electronic devices are required to be thinner accordingly and to have a larger capacity. With this trend, from the viewpoints of increasing battery capacity and reducing cost, packaging materials for batteries are required to be thinner, and the inner layer serving as an insulator is also required to be thinner.

However, if the inner layer is made thinner, fine cracks may more easily develop in the sealant layer due to stress during cold forming, and the electrolyte may penetrate into the cracks and easily deteriorate the insulation properties after forming.

Techniques for improving insulation properties and durability of the sealant layer are under development. For example, PTL 1 proposes a packaging material having a heat seal layer (sealant layer) which is provided with an adhesive polymethylpentene layer for the purpose of preventing short-circuiting between the barrier layer and the tab of the package body caused by the heat and pressure of heat sealing.

CITATION LIST

[Patent Literature] [PTL 1] JP 2002-245983 A

SUMMARY OF THE INVENTION

Technical Problem

Sealant layers used for lithium ion battery packaging materials are liable to develop defects caused by stress generated during the battery manufacturing process, in particular, stretching at the time of forming, or by deformation accompanying volume change such as electrolyte swelling and crystallization during heat sealing/electrolyte bite sealing (hereinafter referred to as degassing heat sealing). As a result of studies made by the inventors of the present invention, insulation properties have been found to be deteriorated due to these defects. It is desired, in particular, to reduce deterioration of insulation properties in the degassing heat-sealing process. In this regard, PTL 1 teaches a sealant layer for reducing or preventing short-circuiting between the metal layer and the tab of a packaging material when heat-sealing the periphery of the packaging material; however, it does not disclose the defects of the sealant layer developed during degassing heat sealing.

The present invention has been made in light of the issues of the conventional art, and has a purpose of providing a power storage device packaging material, which sufficiently maintains insulation properties after degassing heat sealing.

Solution to Problem

As a result of intensive studies to solve the above issues, the inventors of the present invention have found that a packaging material having a sealant layer containing a propylene-based branched polymer having branched chains can sufficiently reduce or prevent lowering of resistance after degassing heat sealing, and completed the present invention on the basis of this finding.

Specifically, the present invention provides a power storage device packaging material including at least a substrate layer, a metal foil layer having an anticorrosion treatment layer on either side or both sides thereof, and a sealant layer in this order. In the packaging material, the sealant layer includes a propylene-based branched polymer-containing layer that contains a propylene-based branched polymer having branched chains.

The power storage device packaging material of the present invention reduces or prevents defects developed in degassing heat-sealing process, and sufficiently maintains insulation properties after degassing heat sealing. Furthermore, this power storage device packaging material sufficiently maintains its insulation properties if the sealant layer is deformed by stress during forming or the like. The inventors of the present invention have speculated as follows regarding a reason for the above power storage device packaging material producing such advantageous effects. The power storage device packaging material has a sealant layer which is liable to develop defects by repeatedly undergoing deformation accompanying volume change due to electrolyte swelling, crystallization, stretching or the like, in the processes of producing the power storage device, such as heat sealing, degassing heat sealing and forming. For example, during top sealing of simultaneously heat-sealing more than one material, such as a tab sealant and a metal tab, deterioration of insulation properties considered to stem from cracks are liable to develop. The cause of developing cracks, for example, lies in the non-uniform thickness of the sealant layer that may easily occur due to its high fluidity when heat-sealed, or non-uniform crystallization that may easily develop during slow cooling. As a result, stress is considered to converge on portions where density is reduced and cause cracks to develop. Moreover, as the sealant layer becomes thin, deformation (foaming) of the sealant layer, which is considered to be caused by volatilization of electrolyte, develops on a large scale in the heat sealing or degassing heat sealing performed after injecting the electrolyte into a pouched packaging material, and the insulation properties are liable to deteriorate. The reason why the insulation properties deteriorate due to the deformation may, for example, be that the portions of the metal foil layer are likely to be exposed by foaming, and that the electrolyte comes into contact with the exposed portions. Moreover, fine cracks are likely to develop in the sealant layer, for example, due to stress or the like during cold forming, and the electrolyte permeates into the cracks to easily deteriorate insulation properties after forming. On the other hand, since the propylene-based branched polymer is supposed to have high melt tension and high curability under strain, the sealant layer including a propylene-based branched polymer-containing layer may reduce or prevent defects accompanying the flow of the sealant layer due to heat or stress generated during heat sealing (e.g., defects developed by the sealant resin flow due to heat generated during sealing, making film thickness distribution in the sealed portion non-uniform, and consequently creating different crystallization states during slow cooling after sealing), or may reduce or prevent deformation of resin due to foaming at the time of degassing heat sealing, and may improve insulation properties stemming from sealing.

In the power storage device packaging material, the content of the propylene-based branched polymer in the sealant layer is preferably 1.0 mass % to 50.0 mass % relative to the total mass of the sealant layer.

If the content of the propylene-based branched polymer is 1.0 mass % or more, deterioration of insulation properties after degassing heat sealing is further reduced or prevented. If the content of the propylene-based branched polymer is 50.0 mass % or less, degassing heat seal strength can be further improved, with electrolyte characteristics and blushing resistance being retained.

In the power storage device packaging material, the sealant layer may include more than one layer, and at least one of the layers may be the propylene-based branched polymer-containing layer.

If the sealant layer includes more than one layer, functions of adhesion, deformation reduction, heat sealing, and the like can be separately imparted to the layers, and therefore properties necessary for a packaging material can be readily improved. Moreover, depending on the number and positions of the propylene-based branched polymer-containing layers in the sealant layer, the degree of deformation of the sealant layer can be easily controlled, and deterioration in insulation properties can be further reduced or prevented. Specifically, for example, if the sealant layer includes a layer containing a propylene-based branched polymer and a layer not containing the propylene-based branched polymer, and if the sealant layer is deformed on the side not containing the propylene-based branched polymer, the layer containing the propylene-based branched polymer may reduce or prevent the deformation. Thus, retention of necessary properties may be balanced with improvement of insulation properties. Moreover, if the propylene-based branched polymer-containing layers are in contact with each other, deformation may be reduced or prevented in the entire sealant and insulation properties may be further improved. Therefore, by adjusting these layer configurations, the degree of deformation of the sealant layer may be easily controlled, and deterioration in insulation properties may be further reduced or prevented.

Moreover, the layer closest to the metal foil layer among the more than one layer (hereinafter also referred to as outermost layer of the sealant layer) is preferably the propylene-based branched polymer-containing layer.

The outermost layer of the sealant layer being a propylene-based branched polymer-containing layer can reduce or prevent deterioration of insulation properties while retaining necessary properties, and can keep good insulation properties for a longer period. This is considered to be because destruction of the sealant layer due to foaming is minimized by the "outermost layer of the sealant layer" while necessary properties are satisfied by the layers other than the "outermost layer of the sealant layer", and because portions of the metal foil layer are prevented from being exposed to and in contact with the electrolyte for a long period of time.

If the "outermost layer of the sealant layer" is a propylene-based branched polymer-containing layer, the outermost layer may further contain an acid-modified polypropylene, a polypropylene with an atactic structure or a propylene-α-olefin copolymer with an atactic structure. Thus, deterioration in lamination strength and insulation properties associated with the electrolyte is further reduced.

The propylene-based branched polymer is preferably a random polypropylene. Thus, necessary properties such as lamination strength, seal strength, blushing resistance and the like are improved and good appearance is kept, and deterioration in insulation properties can be further reduced or prevented.

The power storage device packaging material may further include an adhesive layer between the metal foil layer and the sealant layer, and the adhesive layer may be one that contains at least one curing agent selected from the group consisting of an acid-modified polyolefin, a polyfunctional isocyanate compound, a glycidyl compound, a compound having a carboxy group, a compound having an oxazoline group, and a carbodiimide compound. According to such a power storage device packaging material, deterioration in laminating strength and insulation properties associated with the electrolyte is further reduced.

In the power storage device packaging material, the anticorrosion treatment layer may contain cerium oxide, 1 part by mass to 100 parts by mass of phosphoric acid or phosphate relative to 100 parts by mass of the cerium oxide, and a cationic polymer. In the power storage device packaging material, the anticorrosion treatment layer may be one formed by applying chemical conversion treatment to the metal foil layer, or may be one formed by applying chemical conversion treatment to the metal foil layer and containing cationic polymer. Such a power storage device packaging material can improve adhesion between the metal layer and the adjacent layers (e.g., the outermost layer of the sealant layer and the adhesive layer). Therefore, delamination that would be caused by stress exerted during cold forming and cracks generated thereby are minimized, and deterioration in insulation properties after forming and degassing heat sealing can be further reduced or prevented.

Advantageous Effects of the Invention

The present invention can provide a power storage device packaging material capable of sufficiently retaining insulation properties after degassing heat sealing. The power storage device packaging material of the present invention is capable of sufficiently retaining insulation properties after degassing heat sealing, even when configured as a thin film, for example, even when the layers inner than the metal foil layer are configured to have a total thickness of 35 μm or less. Furthermore, the power storage device packaging material of the present invention can sufficiently retain insulation properties after degassing heat sealing, while having sufficient heat seal strength and degassing heat seal strength even when configured as a thin film.

BRIEF DESCRIPTION OF THE DRAWINGS

FIGS. 5A, 5B, and 5C are sets of schematic diagrams illustrating a method of producing an assessment sample in an example.

DESCRIPTION OF THE REPRESENTATIVE EMBODIMENTS

Figure 1:
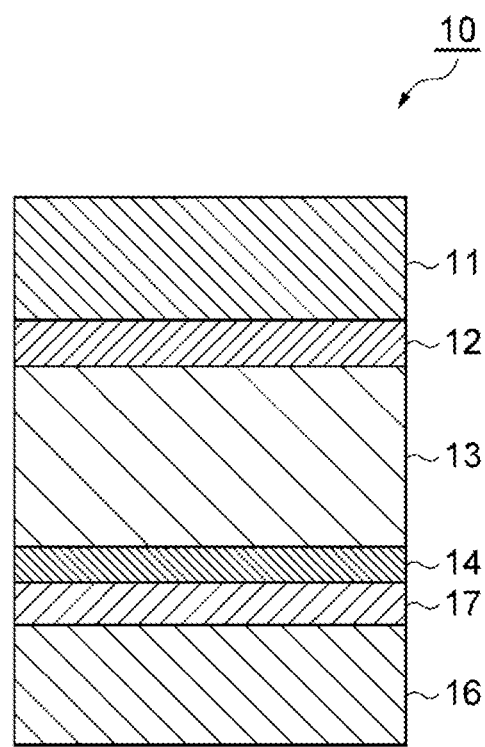
FIG. 1 is a schematic cross-sectional view illustrating a power storage device packaging material according to an embodiment of the present invention.

With reference to the drawings, preferred embodiments of the present invention will be described in detail. With reference to the drawings, embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein. In the drawings, the same or corresponding components are given the same reference numerals to omit duplicate description. Moreover, dimensional ratios of the drawings are not limited to the ratios shown in the drawings.

The power storage device packaging material of the present embodiment includes at least a substrate layer, a metal foil layer having an anticorrosion treatment layer on either side or both sides thereof, and a sealant layer in this order. The sealant layer includes a propylene-based branched polymer-containing layer that contains a propylene-based branched polymer having branched chains. The power storage device packaging material of the present embodiment may have an adhesive layer (hereinafter referred to as first adhesive layer depending on circumstances) between the substrate layer and the metal foil layer having an anticorrosion treatment layer on either side or both sides thereof. Further, the power storage device packaging material according to the present embodiment may have an adhesive layer (hereinafter referred to as second adhesive layer depending on circumstances) between the metal foil layer having an anticorrosion treatment layer on either side or both sides thereof and the sealant layer. The power storage device packaging material of the present embodiment will be hereinafter described by way of some example modes.

[Power Storage Device Packaging Material]

FIG. 1 is a cross-sectional view schematically showing an embodiment of a power storage device packaging material of the present embodiment. As shown in FIG. 1, the packaging material (power storage device packaging material) 10 of the present embodiment is a laminate including, in the following order, a substrate layer 11, a first adhesive layer 12 formed on a surface of the substrate layer 11, a metal foil layer 13 formed on a surface of the first adhesive layer 12 on a side opposite to that facing the substrate layer 11, an anticorrosion treatment layer 14 formed on a surface of the metal foil layer 13 on a side opposite to that facing the first adhesive layer 12, a second adhesive layer 17 formed on a surface of the anticorrosion treatment layer 14 on a side opposite to that facing the metal foil layer 13, and a sealant layer 16 formed on a surface of the second adhesive layer 17 on a side opposite to that facing the anticorrosion treatment layer 14. In the packaging material 10, the substrate layer 11 is the outermost layer and the sealant layer 16 is the innermost layer. In other words, the packaging material 10 is used with the substrate layer 11 being on the outside of the power storage device and the sealant layer 16 being on the inside of the power storage device. Each layer will be described.

<Substrate Layer 11>

The substrate layer 11 is provided for the purpose of imparting heat resistance in the sealing step at the time of producing the power storage device, and taking measures against pinholes that would develop during processing or distribution. A resin layer having insulation properties is preferably used for the substrate layer 11. Examples of the resin layer that can be used include stretched or unstretched films such as a polyester film, a polyamide film, and a polypropylene film. These films may be used singly as a monolayer, or by laminating two or more as a multilayer. Alternatively, a coextruded multilayer stretched film may be used obtained by coextruding a polyethylene terephthalate (PET) film and a nylon (Ny) film using an adhesive resin, and thereafter applying stretching treatment.

The substrate layer 11 preferably has a thickness in the range of 6 μm to 40 μm, and more preferably 10 μm to 25 μm. When the thickness of the substrate layer 11 is 6 μm or more, there is a tendency to improve pinhole resistance and insulation properties of the power storage device packaging material 10. When the thickness of the substrate layer 11 is 40 μm or less, the deep-drawing formability of the power storage device packaging material 10 can be sufficiently ensured.

The substrate layer 11 may be directly formed on the metal foil layer 13 without the first adhesive layer 12 being interposed therebetween. The method of directly forming the substrate layer 11 on the metal foil layer 13 may be, for example, a coating method of applying a coating liquid containing a resin material. The resin material may be a polyester, a fluororesin, an acrylic resin, or the like. In particular, a urethane acrylate is preferable as the resin material. The coating liquid containing a resin material may be a two-part curing type coating liquid. The substrate layer 11 formed by the coating method preferably has a thickness in the range of 3 µm to 30 µm, and more preferably 5 µm to 20 µm.

<First Adhesive Layer 12>

The first adhesive layer 12 serves as a layer for bonding the substrate layer 11 and the metal foil layer 13. For example, the material used for forming the first adhesive layer 12 may be specifically a polyurethane resin prepared by reacting a bifunctional or higher functional isocyanate compound with a main resin such as a polyester polyol, polyether polyol, acrylic polyol, carbonate polyol, or the like.

These various polyols can be used alone or in combination of two or more, according to the functions and performance sought in the packaging material.

Further, for the purpose of promoting adhesion, a carbodiimide compound, an oxazoline compound, an epoxy compound, a phosphorus compound, a silane coupling agent, or the like may be added to the polyurethane resin mentioned above.

Moreover, other various additives and stabilizers may be added to the polyurethane resin mentioned above depending on the performance required of the adhesive.

The thickness of the first adhesive layer 12 is not particularly limited, but from the perspective of obtaining desired adhesive strength, conformability, processability and the like, for example, the thickness is preferably 1 µm to 10 µm, and more preferably 3 µm to 7 µm.

<Metal Foil Layer 13>

The metal foil layer 13 has water vapor barrier properties to prevent moisture from infiltrating into the power storage device. Further, the metal foil layer 13 has ductility for deep drawing. Metal foil layers 13 that can be used include various metal foils such as aluminum, stainless steel, and the like. In terms of mass (specific gravity), moisture resistance, processability and cost, aluminum foil is preferable.

The aluminum foil may be a soft aluminum foil, particularly one subjected to an annealing treatment. It is more preferable to use an aluminum foil containing iron for the purpose of further imparting pinhole resistance and ductility at the time of forming. The iron content in the aluminum foil is preferably in the range of 0.1 mass % to 9.0 mass % relative to 100 mass % of aluminum foil, and more preferably in the range of 0.5 mass % to 2.0 mass %. When the content of iron is 0.1 mass % or more, a packaging material 10 having much better pinhole resistance and ductility can be obtained. When the content of iron is 9.0 mass % or less, a packaging material 10 having much better flexibility can be obtained.

The thickness of the metal foil layer 13 is not particularly limited, but is preferably in the range of 9 µm to 200 µm, and more preferably 15 µm to 100 µm, in terms of barrier properties, pinhole resistance and processability.

When using an aluminum foil in the metal foil layer 13, an untreated aluminum foil may be used as the aluminum foil, but an aluminum foil subjected to a degreasing treatment is preferably used from the viewpoint of imparting electrolyte resistance.

It should be noted that when the aluminum foil is degreased, only one surface of the aluminum foil may be degreased, or both surfaces may be degreased.

<Anticorrosion Treatment Layer 14>

The corrosion prevention treatment layer 14 is provided to prevent corrosion of the metal foil layer 13 caused by hydrofluoric acid which is generated by the electrolyte, or, by reaction of the electrolyte with moisture. The anticorrosion treatment layer 14 is formed by, for example, degreasing treatment, hydrothermal modification treatment, anodic oxidation treatment, chemical conversion treatment, or a combination of these treatments.

Examples of the degreasing treatment include acid degreasing and alkaline degreasing. The acid degreasing may be a method using an inorganic acid such as sulfuric acid, nitric acid, hydrochloric acid or hydrofluoric acid alone, or a mixture of these acids. The acid degreasing may include use of an acid degreasing agent obtained by dissolving a fluorine-containing compound such as monosodium ammonium difluoride with the aforementioned inorganic acid. Specifically when an aluminum foil is used as the metal foil layer 13, use of this acid degreasing agent is effective in terms of hydrofluoric acid resistance, for its contribution to forming a fluoride of aluminum in a passive state, in addition to obtaining the effect of degreasing aluminum. The alkaline degreasing may be a method using sodium hydroxide or the like.

For example, the hydrothermal modification treatment may be a boehmite treatment of immersion-treating an aluminum foil in boiling water to which triethanolamine has been added.

For example, the anodic oxidation treatment may be an alumite treatment.

The chemical conversion treatment may be of an immersion type or a coating type. The immersion type chemical conversion treatment may be, for example, chromate treatment, zirconium treatment, titanium treatment, vanadium treatment, molybdenum treatment, calcium phosphate treatment, strontium hydroxide treatment, cerium treatment, ruthenium treatment, or various chemical conversion treatments of mixed phases thereof. The coating type chemical conversion treatment may be a method of applying a coating agent having a corrosion prevention performance onto the metal foil layer 13.

Of these anticorrosion treatments, if at least part of the anticorrosion treatment layer is formed by any of hydrothermal modification treatment, anodization and chemical conversion treatment, degreasing treatment is preferably performed in advance. If a degreased metal foil, such as an annealed metal foil, is used as the metal foil layer 13, the degreasing treatment is not necessary in forming the anticorrosion treatment layer 14.

The coating agent used for the coating type chemical conversion treatment preferably contains trivalent chromium. The coating agent may contain at least one polymer selected from the group consisting of a cationic polymer and an anionic polymer to be described later.

Of the treatments mentioned above, the hydrothermal modification treatment and the anodic oxidation treatment, in particular, dissolve the surface of an aluminum foil with a treating agent and form an aluminum compound having good corrosion resistance (such as boehmite or alumite). Thus, these treatments, which form a co-continuous structure extending from the metal foil layer 13 using the aluminum foil to the anticorrosion treatment layer 14, are encompassed by the definition of the chemical conversion treatment. However, the anticorrosion treatment layer 14 can be formed only by a pure coating method that is not encompassed by the definition of the chemical conversion treatment, as will be described later. For example, this coating method may be a method using a rare-earth oxide sol, such as cerium oxide with a mean particle size of 100 nm or less exhibiting an anticorrosion effect (inhibitor effect) for aluminum, as a material preferable in terms of environmental aspects. Use of this method makes it possible to impart an anticorrosion effect to a metal foil such as an aluminum foil even when using an ordinary coating method.

Examples of the rare-earth oxide sol include sols using various solvents such as an aqueous solvent, an alcohol-based solvent, a hydrocarbon-based solvent, a ketone-based solvent, an ester-based solvent, an ether-based solvent, and the like. Of these sols, an aqueous sol is preferable.

To stabilize a dispersion, the rare-earth oxide sol may contain, as a dispersion stabilizer, an inorganic acid such as nitric acid, hydrochloric acid, phosphoric acid, or the like or a salt thereof, or an organic acid such as acetic acid, malic acid, ascorbic acid, lactic acid, or the like. Of these dispersion stabilizers, phosphoric acid, in particular, is expected to impart the packaging material 10 with features of (1) stabilizing dispersion of the sol, (2) improving adhesion to the metal foil layer 13 making use of an aluminum chelate ability of phosphoric acid, (3) imparting electrolyte resistance by trapping aluminum ions eluted under the influence of hydrofluoric acid (passive state formation), (4) improving cohesive force of the anticorrosion treatment layer 14 (oxide layer) by readily inducing dehydration condensation of phosphoric acid even at low temperature, and the like.

The phosphoric acid mentioned above or a salt thereof may be orthophosphoric acid, pyrophosphoric acid, metaphosphoric acid, or an alkali metal salt, or an ammonium salt thereof. Of these phosphoric acids or salts thereof, condensed phosphoric acid such as trimetaphosphoric acid, tetrametaphosphoric acid, hexametaphosphoric acid, or ultrametaphosphoric acid, or an alkali metal salt, or an ammonium salt thereof is preferable for functional development in the packaging material 10. Considering the dry film forming properties (drying capacity and heat quantity) when forming the anticorrosion treatment layer 14 made of a rare-earth oxide by various coating methods using the rare-earth oxide sol mentioned above, a sodium salt is more preferable from the perspective of exhibiting good dehydrating condensation at low temperature. The phosphate salt is preferably a water-soluble salt.

The content of phosphoric acid (or a salt thereof) is preferably 1 part by mass to 100 parts by mass relative to 100 parts by mass of the rare-earth oxide. If the content of the phosphoric acid or a salt thereof is not less than 1 part by mass, the rare-earth oxide sol becomes more stable and the function of the packaging material 10 becomes much better. The content of the phosphoric acid or a salt thereof is more preferably not less than 5 parts by mass relative to 100 parts by mass of the rare-earth oxide. If the content of the phosphoric acid or a salt thereof is not more than 100 parts by mass relative to 100 parts by mass of the rare-earth oxide, the function of the rare-earth oxide sol is enhanced, so that better performance is exhibited for preventing permeation of the electrolyte. The content of the phosphoric acid or a salt thereof is preferably not more than 50 parts by mass relative to 100 parts by mass of the rare-earth oxide, and more preferably not more than 20 parts by mass.

Since the anticorrosion treatment layer 14 formed of the rare-earth oxide sol is an aggregate of inorganic particles, the cohesive force of the layer itself may be lowered even after being dry-cured. Therefore, the anticorrosion treatment layer 14 in this case is preferably compounded with an anionic polymer or a cationic polymer mentioned below to supplement the cohesive force.

The anionic polymer may be a polymer having a carboxy group. For example, poly (meth)acrylic acid (or a salt thereof), or a copolymer containing poly (meth)acrylic acid as a main component can be named. The copolymerization component of the copolymer includes an alkyl (meth)acrylate monomer (having a methyl group, an ethyl group, an n-propyl group, an i-propyl group, an n-butyl group, an i-butyl group, a t-butyl group, a 2-ethylhexyl group, or a cyclohexyl group as an alkyl group); an amide group-containing monomer, such as (meth)acrylamide, N-alkyl (meth)acrylamide, or N,N-dialkyl (meth)acrylamide (having a methyl group, an ethyl group, an n-propyl group, an i-propyl group, an n-butyl group, an i-butyl group, a t-butyl group, a 2-ethylhexyl group, a cyclohexyl group, etc. as an alkyl group), N-alkoxy (meth)acrylamide, or N,N-dialkoxy (meth)acrylamide (having a methoxy group, an ethoxy group, a butoxy group, an isobutoxy group, etc. as an alkoxy group), N-methylol (meth)acrylamide, or N-phenyl (meth)acrylamide; a hydroxyl group-containing monomer, such as 2-hydroxyethyl (meth)acrylate, or 2-hydroxypropyl (meth)acrylate; a glycidyl group-containing monomer, such as glycidyl (meth)acrylate, or allyl glycidyl ether; a silane-containing monomer, such as (meth)acryloxypropyltrimethoxysilane or (meth)acryloxypropyltriethoxysilane; or an isocyanate such as (meth)acryloxypropyl isocyanate.

These anionic polymers improve the stability of the anticorrosion treatment layer 14 (oxide layer) obtained using the rare-earth oxide sol. The improvement is achieved by the effect of protecting a hard and brittle oxide layer with the acrylic resin component, and the effect of capturing ion contamination (particularly sodium ions) derived from the phosphoric acid contained in the rare-earth oxide sol (cation catcher). That is, if the anticorrosion treatment layer 14 obtained using the rare-earth oxide sol contains alkali metal ions such as sodium ions or alkaline earth metal ions in particular, the anticorrosion treatment layer 14 is likely to be deteriorated starting from the site containing the ions. Therefore, the sodium ion or the like contained in the rare-earth oxide sol is fixed with the anionic polymer to improve the durability of the anticorrosion treatment layer 14.

The anticorrosion treatment layer 14 that is the combination of the anionic polymer and the rare-earth oxide sol has anticorrosion performance equivalent to that of the anticorrosion treatment layer 14 formed by applying chromate treatment to an aluminum foil. The anionic polymer preferably has a structure where a polyanionic polymer which is essentially water-soluble is crosslinked. The crosslinking agent used for forming this structure may be a compound having, for example, an isocyanate group, a glycidyl group, a carboxyl group or an oxazoline group.

Examples of the compound having an isocyanate group include a diisocyanate such as tolylene diisocyanate, xylylene diisocyanate or a hydrogenated product thereof, hexamethylene diisocyanate, 4,4'-diphenylmethane diisocyanate or a hydrogenated product thereof, isophorone diisocyanate; or a polyisocyanate such as an adduct form obtained by reacting these isocyanates with a polyhydric alcohol, such as trimethylolpropane, a biuret obtained by reacting the isocyanates with water, or an isocyanurate as a trimer; and a blocked polyisocyanate obtained by blocking these polyisocyanates with an alcohol, a lactam, an oxime, or the like.

Examples of the compound having a glycidyl group include an epoxy compound obtained by permitting epichlorohydrin to act on a glycol, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, or neopentyl glycol; and an epoxy compound obtained by permitting epichlorohydrin to act on a polyhydric alcohol, such as glycerin, polyglycerin, trimethylolpropane, pentaerythritol, or sorbitol, or an epoxy compound obtained by permitting epichlorohydrin to act on a dicarboxylic acid, such as phthalic acid, terephthalic acid, oxalic acid, or adipic acid.

Examples of the compound having a carboxyl group includes various aliphatic or aromatic dicarboxylic acids and the like. Also, poly(meth)acrylic acid or an alkali (earth) metal salt of poly(meth)acrylic acid may be used.

Examples of the compound having an oxazoline group include a low molecular weight compound having two or more oxazoline units, or when using a polymerizable monomer such as isopropenyloxazoline, a compound obtained by copolymerizing with an acrylic monomer such as (meth) acrylic acid, (meth)acrylic alkyl ester, and hydroxyalkyl (meth)acrylate.

Similarly to a silane coupling agent, the anionic polymer may have a siloxane bond at a crosslinking point as a result of permitting the functional group to selectively react with an amine. In this case, γ-glycidoxypropyltrimethoxysilane, γ-glycidoxypropyltriethoxysilane, β-(3,4-epoxycyclohexyl) ethyltrimethoxysilane, γ-chloropropylmethoxysilane, vinyltrichlorosilane, γ-mercaptopropyltrimethoxysilane, γ-aminopropyltriethoxysilane, N-β(aminoethyl)-γ-aminopropyltrimethoxysilane, or γ-isocyanatepropyltriethoxysilane, or the like may be used. Of these materials, an epoxy silane, aminosilane or isocyanate silane is preferable in terms of reactivity with an anionic polymer or a copolymer thereof in particular.

The ratio of these crosslinking agents to the anionic polymer is preferably in the range of 1 part by mass to 50 parts by mass, and more preferably 10 parts by mass to 20 parts by mass, relative to 100 parts by mass of the anionic polymer. When the ratio of the crosslinking agent is not less than 1 part by mass relative to 100 parts by mass of the anionic polymer, a crosslinked structure is likely to be sufficiently formed. When the ratio of the crosslinking agent is not more than 50 parts by mass relative to 100 parts by mass of the anionic polymer, pot life of the coating solution improves.

The method used for crosslinking the anionic polymer may be a method of forming an ionic crosslinkage using titanium, zirconium compound or the like, and is not limited to the use of the crosslinking agents mentioned above.

The cationic polymer may be a polymer having an amine, including polyethyleneimine, an ionic polymer complex composed of a polymer having polyethyleneimine and a carboxylic acid, a primary amine graft acrylic resin obtained by grafting a primary amine to an acrylic backbone, polyallylamine or derivatives thereof, and aminophenol.

The cationic polymer is preferably used in combination with a crosslinking agent having a functional group, such as a carboxy group or a glycidyl group, capable of reacting with an amine/imine. The crosslinking agent to be used in combination with the cationic polymer may be a polymer having carboxylic acid that forms an ionic polymer complex with polyethyleneimine. Examples of such a crosslinking agent include polycarboxylic acid (salt) such as polyacrylic acid or ionic salts thereof, copolymer having a comonomer introduced thereto, polysaccharides having a carboxy group such as carboxymethyl cellulose or ionic salts thereof, or the like. Examples of the polyallylamine include homopolymers or copolymers of allylamine, allylamine amide sulfate, diallylamine, or dimethylallylamine, and the like. These amines may be free amines or may be ones stabilized with acetic acid or hydrochloric acid. Maleic acid, sulfur dioxide or the like may be used as a copolymer component. Furthermore, a primary amine may be used after being partially methoxylated to impart crosslinking properties thereto, or aminophenol may also be used. In particular, allylamine or derivatives thereof are preferable.

In the present embodiment, the cationic polymer is also mentioned as a component constituting the anticorrosion treatment layer 14. The reason for this is that, as a result of detailed studies using various compounds to find a way to impart electrolyte resistance and hydrofluoric acid resistance required of a power storage device packaging material, it has been found that the cationic polymer in itself is also a compound capable of imparting electrolyte resistance and hydrofluoric acid resistance to the package. This is inferred to be the result of inhibiting damage to the aluminum foil by capturing fluorine ions with cationic groups (anion catcher).

The cationic polymer is a more preferable material from the perspective of improving adhesiveness. Since the cationic polymer is water-soluble similarly to the anionic polymer mentioned above, it is more preferable to impart water resistance by permitting it to form a crosslinked structure. The crosslinking agent that can be used for forming a crosslinked structure in the cationic polymer may include ones mentioned in the section on the anionic polymer. When a rare-earth oxide sol is used as the anticorrosion treatment layer 14, a cationic polymer may be used as a protective layer, instead of using the anionic polymer mentioned above.

The anticorrosion treatment layer is a chemical conversion treatment layer obtained through chemical conversion treatment represented by a chromate treatment, and is permitted to form a gradient structure relative to the aluminum foil. To form the gradient structure, the chemical conversion treatment layer is formed on the aluminum foil by treating the aluminum foil using, in particular, a chemical conversion treating agent containing hydrofluoric acid, hydrochloric acid, nitric acid, sulfuric acid, or a salt thereof, followed by reaction with a chromium- or non-chromium-based compound. However, the chemical conversion treatment, which uses an acid as a chemical conversion treating agent, causes deterioration of the working environment and corrosion of the coating device. In this regard, the coating-type anticorrosion treatment layer 14 mentioned above does not need to form a gradient structure relative to the metal foil layer 13 of an aluminum foil, unlike the anticorrosion treatment layer obtained through the chemical conversion treatment represented by a chromate treatment. Therefore, the properties of the coating agent are not restricted in terms of acidity, alkalinity, neutrality and the like, and a good working environment can be achieved. The coating-type anticorrosion treatment layer 14 is preferable since chromate treatment using a chromium compound requires alternatives in terms of environmental health.

Based on the above, coating-type anticorrosion treatments as mentioned above can be combined as follows, for example: (1) rare-earth oxide sol alone, (2) anionic polymer alone, (3) cationic polymer alone, (4) rare-earth oxide sol+ anionic polymer (laminated composite), (5) rare-earth oxide sol+cationic polymer (laminated composite), (6) rare-earth oxide sol+anionic polymer (laminated composite)/cationic polymer (multilayered), (7) rare-earth oxide sol+cationic polymer (laminated composite)/anionic polymer (multilayered). Of these combinations, (1) and (4) to (7) are preferable, and (4) to (7) are more preferable. However, the present embodiment should not limit combinations to ones mentioned above. For example, an anticorrosion treatment is selected as follows. Specifically, the cationic polymer is a very preferable material in terms of having good adhesion to a modified polyolefin resin, as will be described in the section of second adhesive layer or sealant layer. Therefore, when the second adhesive layer or the sealant layer is formed of a modified polyolefin resin, the anticorrosion treatment layer may be so designed that a cationic polymer is provided to the surface thereof contacting the second adhesive layer or the sealant layer (e.g., combination (5) or (6), etc.).

The anticorrosion treatment layer 14 is not limited to the layer mentioned above. For example, the anticorrosion treatment layer 14 may be formed using a treating agent which is obtained by adding phosphoric acid and a chromium compound to a resin binder (such as aminophenol) as in a coating-type chromate based on known art. When this treating agent is used, the resultant layer will have both a corrosion-preventing function and adhesion. Although it is necessary to consider stability of a coating solution, a coating agent may be prepared in advance by integrating a rare-earth oxide sol with a polycationic polymer or a polyanionic polymer, and using this coating agent, the anticorrosion treatment layer 14 may be formed being imparted with both the corrosion preventing function and adhesion.

Regardless of having a multilayer structure or a monolayer structure, mass per unit area of the anticorrosion treatment layer 14 is preferably 0.005 g/m2 to 0.200 g/m2, and more preferably 0.010 g/m2 to 0.100 g/m2. When the mass per unit area is 0.005 g/m2 or more, a corrosion prevention function can be readily imparted to the metal foil layer 13. Even if the mass per unit area exceeds 0.200 g/m2, there is little change in the corrosion preventing function. If a rare-earth oxide sol is used and if the coating film is thick, heat-curing at the time of drying may be insufficient, and may decrease the cohesive force. It should be noted that the thickness of the anticorrosion treatment layer 14 can be converted from its specific gravity.

From the perspective of further reducing or preventing deterioration of insulation properties after forming and degassing heat sealing, the anticorrosion treatment layer 14 may be one containing, for example, cerium oxide, 1 part by mass to 100 parts by mass of phosphoric acid or phosphate relative to 100 parts by mass of the cerium oxide, and a cationic polymer, or it may be one formed by applying a chemical conversion treatment to the metal foil layer 13, or may be one containing a cationic polymer and formed by applying a chemical conversion treatment to the metal foil layer 13.

<Second Adhesive Layer 17>

The second adhesive layer 17 bonds the metal foil layer 13 on which the anticorrosion treatment layer 14 is formed, to the sealant layer 16. A general-purpose adhesive for bonding a metal foil layer to a sealant layer may be used for the second adhesive layer 17.

If the anticorrosion treatment layer 14 has a layer containing at least one polymer selected from the group consisting of the cationic polymers and the anionic polymers mentioned above, the second adhesive layer 17 preferably contains a compound having reactivity (hereinafter also referred to as a reactive compound) with the polymer mentioned above contained in the anticorrosion treatment layer 14.

For example, if the anticorrosion treatment layer 14 contains a cationic polymer, the second adhesive layer 17 may contain a compound having reactivity with the cationic polymer. If the anticorrosion treatment layer 14 contains an anionic polymer, the second adhesive layer 17 may contain a compound having reactivity with the anionic polymer. If the anticorrosion treatment layer 14 contains both a cationic polymer and an anionic polymer, the second adhesive layer 17 may contain a compound having reactivity with the cationic polymer and a compound having reactivity with the anionic polymer. However, the second adhesive layer 17 does not necessarily need to contain the two kinds of compounds, but may contain a compound having reactivity with both of the cationic polymer and the anionic polymer. The expression having reactivity refers to forming a covalent bond with a cationic polymer or an anionic polymer. The second adhesive layer 17 may further contain an acid-modified polyolefin resin.

The compound having reactivity with the cationic polymer may be at least one compound selected from the group consisting of a polyfunctional isocyanate compound, a glycidyl compound, a compound having a carboxy group, and a compound having an oxazoline group.

The polyfunctional isocyanate compound, the glycidyl compound, the compound having a carboxy group, or the compound having an oxazoline group may be a polyfunctional isocyanate compound, a glycidyl compound, a compound having a carboxy group, a compound having an oxazoline group, or the like mentioned above, as a crosslinking agent for converting the cationic polymer into a crosslinked structure. In particular, a polyfunctional isocyanate compound is preferable from the perspective of having high reactivity with a cationic polymer and being readily formed into a crosslinked structure.

The compound having reactivity with the anionic polymer may be at least one compound selected from the group consisting of a glycidyl compound, and a compound having an oxazoline group. The glycidyl compound or the compound having an oxazoline group may be a glycidyl compound, a compound having an oxazoline group, or the like, mentioned above, as a crosslinking agent for converting the cationic polymer into a crosslinked structure. Of these compounds, the glycidyl compound is preferable from the perspective of having high reactivity with an anionic polymer.

If the second adhesive layer 17 contains an acid-modified polyolefin resin, it is preferable that the reactive compound is also reactive with the acidic group in the acid-modified polyolefin resin (i.e., forms a covalent bond with the acidic group). Thus, adhesion to the anticorrosion treatment layer 14 is further enhanced. In addition, the acid-modified polyolefin resin is permitted to have a crosslinked structure to further improve solvent resistance of the packaging material 20.

The content of the reactive compound is preferably 1 to 10 equivalents relative to the acidic group in the acid-modified polyolefin resin. When the content is 1 or more equivalents, the reactive compound sufficiently reacts with the acidic group in the acid-modified polyolefin resin. If the content exceeds 10 equivalents, sufficient saturation is reached as a crosslinking reaction with the acid-modified polyolefin resin, and therefore unreacted substances may remain and thus various performances may deteriorate.

The acid-modified polyolefin resin is obtained by introducing an acidic group into a polyolefin resin. The acidic group may be a carboxy group, sulfonic acid group, or the like. The carboxy group is particularly preferable. The acid-modified polyolefin resin may be, for example, the same resin as one mentioned later as a modified polyolefin resin (a) used for the first sealant layer 16a.

Various additives such as a flame retardant, slip agent, antiblocking agent, antioxidant, light stabilizer, tackifier, or the like may be added to the second adhesive layer 17.

From the perspective of reducing or preventing deterioration in lamination strength associated with the electrolyte and the perspective of further reducing or preventing deterioration in insulation properties, the second adhesive layer 17 may contain, for example, acid-modified polyolefin, and at least one curing agent selected from the group consisting of polyfunctional isocyanate compound, glycidyl compound, compound having a carboxy group, compound having an oxazoline group, and carbodiimide compound. Examples of the carbodiimide compound include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, and N,N'-di-p-tolylcarbodiimide.

The adhesive used for forming the second adhesive layer 17 may be, for example, a polyurethane-based adhesive obtained by adding polyester polyol containing hydrogenated dimer fatty acid and diol to polyisocyanate.

The thickness of the second adhesive layer 17 is not particularly limited, but from the perspective of obtaining a desired adhesive strength, processability and the like, the thickness is preferably in the range of 1 μm to 10 μm, and more preferably 3 μm to 7 μm.

<Sealant Layer 16>

The sealant layer 16 imparts sealing properties to the packaging material 10 due to heat sealing. The sealant layer 16 may be one that is formed containing a propylene-based branched polymer having branched chains (e.g., a long chain branch).

If the sealant layer is a monolayer as shown in FIG. 1, the sealant layer may be a propylene-based branched polymer-containing layer that contains a propylene-based branched polymer having branched chains.

The propylene-based branched polymer has branched chains separately from the main chain.

The propylene-based branched polymer may be, for example, the materials mentioned in JP 4553966 B or JP 2011-144356 A.

From the perspective of reducing or preventing deterioration in insulation properties accompanying foaming at the time of degassing heat sealing, it is preferable that the sealant layer melted by heat at the time of sealing has melt tension or curability under strain sufficient to withstand foaming. In this regard, the number of branched carbons is preferably 500 or more. Use of such a material can further reduce or prevent deterioration of insulation at the time of degassing heat sealing.

As mentioned above, the number of carbons of branched chains of the propylene-based branched polymer is preferably 500 or more. The number of carbons of branched chains of the propylene-based branched polymer is, for example, preferably 10,000 or more, more preferably 20,000 or more, and even more preferably 40,000 or more. The branched chains of the propylene-based branched polymer, for example, preferably have a structural unit derived from propylene. The propylene-based branched polymer preferably does not have a framework structure such as a cross-linked structure. The presence/absence of long-chain branches in the propylene-based branched polymer can be measured from the radius of gyration in each molecular weight using, for example, GPC-MALS. The weight average molecular weight of the propylene-based branched polymer is, for example, preferably in the range of 50,000 to 1,000,000, and preferably 100,000 to 800,000. The weight average molecular weight can be measured by GPC.

Moreover, the presence/absence of the branched structure of the propylene-based branched polymer can be analyzed, for example, by applying the analysis described in paragraph [0093] and onwards of JP 2011-144356 A. The branched structure (e.g., branching index) of the branched polymer may be specified, for example, from the difference in radius of gyration between a branched polymer and a linear polymer having the same molecular weight. For example, in a mixed resin obtained by mixing a branched polymer and a linear polymer as well, the branched structure of a branched polymer may be estimated from the molecular weight of the branched polymer and the linear polymer, the radius of gyration of the mixed resin, and the radius of gyration of the linear polymer. For example, the radius of gyration of a mixed resin of a branched polymer and a linear polymer is considered to be smaller than the radius of gyration of a linear polymer having the same molecular weight. The radius of gyration mentioned above can also be estimated, for example, from the intrinsic viscosity.

The propylene-based branched polymer has a structural unit derived from propylene. Examples of the propylene-based branched polymer include homopolypropylene, random polypropylene (propylene-ethylene random copolymer), block polypropylene, and a copolymer of α-olefin and propylene (propylene-based copolymer) other than ethylene and propylene. The propylene-based branched polymer may be acid-modified. If the propylene-based branched polymer contains a structural unit other than the structure derived from propylene, the chain may be branched from a portion other than the structure derived from propylene.

Specific examples of the α-olefin as a monomer constituting the propylene-based copolymer include 1-butene, 1-pentene, 3-methyl-1-butene, 1-hexene, 3-methyl-1-pentene, 4-methyl-1-pentene, and the like.

The propylene-based branched polymer is preferably a random polypropylene.

The propylene-based branched polymer-containing layer as the sealant layer 16 may contain components other than the propylene-based branched polymer. The propylene-based branched polymer-containing layer as the sealant layer 16 may be formed of, for example, resin compositions as a base (hereinafter also referred to as base resin compositions), and a propylene-based branched polymer. The base resin compositions mentioned above refer to the components excluding the propylene-based branched polymer from all the constituent components of the sealant layer 16. If the sealant layer 16 contains the base resin compositions, the contents of the base resin compositions may be, for example, in the range of 20 mass % to 99.9 mass %, or may be 50 mass % to 99 mass % relative to the total mass of the sealant layer 16. The content of the propylene-based branched polymer may be, for example, in the range of 0.1 mass % to 80 mass %, or may be 1 mass % to 50 mass % relative to the total mass of the sealant layer 16.

The base resin compositions (excluding the propylene-based branched polymer mentioned above) are not particularly limited, but may be, for example, a resin composition (hereinafter may also be referred to as resin composition α) containing 60 mass % to 95 mass % of propylene-ethylene random copolymer (A), and 5 mass % to 40 mass % of a polyolefin-based elastomer (B) having 1-butene as a comonomer and having a melting point of 150° C. or lower. Since such a resin composition excels at miscibility with the propylene-based branched polymer, it is considered that various properties such as lamination strength, seal strength, blushing resistance, and the like are further improved. That is, the sealant layer 16 may be formed of the resin composition α as a base resin composition and the propylene-based branched polymer. In this case, the content of the resin composition α may be, for example, in the range of 20 mass % to 99.9 mass %, or may be 50 mass % to 99 mass % relative to the total mass of the sealant layer 16. The content of the propylene-based branched polymer may be, for example, in the range of 0.1 mass % to 80 mass %, or may be 1 mass % to 50 mass % relative to the total mass of the sealant layer 16.

[Resin Composition α (Excluding Propylene-Based Branched Polymer)]

As mentioned above, the resin composition α contains 60 mass % to 95 mass % of propylene-ethylene random copolymer (A), and 5 mass % to 40 mass % of a polyolefin-based elastomer (B) having 1-butene as a comonomer and having a melting point of 150° C. or lower.

(Propylene-Ethylene Random Copolymer (A))

The propylene-ethylene random copolymer (A) excels at heat sealing properties at low temperature as compared to the propylene-ethylene block copolymer and the propylene homopolymer, and improves sealing properties against the electrolyte.

In the propylene-ethylene random copolymer (A), the content of ethylene is preferably in the range of 0.1 mass % to 10 mass %, more preferably 1 mass % to 7 mass %, and even more preferably 2 mass % to 5 mass %. When the content of ethylene is 0.1 mass % or more, a melting point lowering effect may be sufficiently obtained by copolymerization of ethylene, and sealing properties against the electrolyte may be further improved, and impact resistance may be obtained, and the seal strength or blushing resistance may be improved. When the content of ethylene is 10 mass % or less, the melting point may be prevented from being excessively lowered, and development of excessively sealed portion may be more sufficiently prevented. It should be noted that the content of ethylene can be calculated from the mixing ratio of monomers at the time of polymerization.

The melting point of the propylene-ethylene random copolymer (A) is preferably in the range of 120° C. to 145° C., and more preferably 125° C. to 140° C. When the melting point is 120° C. or more, development of excessively sealed portions may be more effectively prevented. When the melting point is 145° C. or less, sealing properties against the electrolyte may be further improved.

The weight average molecular weight of the propylene-ethylene random copolymer (A) is preferably appropriately adjusted so that the melting point will be within the ranges mentioned above, and is more preferably in the range of 10,000 to 1,000,000, and even more preferably 100,000 to 300,000.

The propylene-ethylene random copolymer (A) may be acid-modified. For example, it may be an acid-modified propylene-ethylene random copolymer obtained by graft-modifying maleic anhydride. Use of the acid-modified propylene-ethylene random copolymer can retain adhesion to the tab lead without the need of using a tab sealant.

Such propylene-ethylene random copolymers (A) may be used singly, or in combination of two or more.

In the resin composition α, the content of the component (A) is in the range of 60 mass % to 95 mass %, preferably 60 mass % to 90 mass %, and more preferably 60 mass % to 85 mass %, relative to the total solid content of the resin composition α. The content of the component (A) being 60 mass % or more can improve sealing properties due to the effect of using this component (A). Moreover, the content of the component (A) being 60 mass % or more can prevent the component (B) from being excessively present. Therefore, deterioration in heat resistance of the sealant layer 16 is reduced or prevented, and development of excessively sealed portion is reduced or prevented. The content of the component (A) being 95 mass % or less can lead to the content of the component (B) being 5 mass % or more. Therefore, the effect of improving degassing heat seal strength can be sufficiently exerted by the component (B).

(Polyolefin-based Elastomer (B) Having 1-butene as Comonomer and Having Melting Point of 150° C. or Less)

A polyolefin-based elastomer (B) having 1-butene as a comonomer and having a melting point of 150° C. or less contributes to improving sealing properties, including degassing heat seal strength, against the electrolyte, and also contributes to reducing or preventing occurrence of blushing.

The polyolefin-based elastomer (B) may have miscibility with the component (A) or may not have miscibility therewith; however, may preferably contain both a miscible polyolefin-based elastomer (B-1) having miscibility, and an immiscible polyolefin-based elastomer (B-2) not having miscibility. Having miscibility (miscible system) with the component (A) means that the polyolefin-based elastomer (B) is dispersed with a dispersed phase size of 1 nm or more and less than 500 nm in the propylene-ethylene random copolymer resin constituting the component (A). Not having miscibility (immiscible system) means that the polyolefin-based elastomer (B) is dispersed with a dispersed phase size of 500 nm or more and less than 20 μm in the propylene-ethylene random copolymer resin constituting the component (A).

The miscible polyolefin-based elastomer (B-1) may be, for example, propylene-1-butene random copolymer.

The immiscible polyolefin-based elastomer (B-2) may be, for example, ethylene-1-butene random copolymer.

The melting point of the polyolefin-based elastomer (B) is required to be 150° C. or less, but from the perspective of reducing or preventing development of excessively sealed portions and blushing, and improving sealing properties against the electrolyte, the melting point is preferably in the range of 60° C. to 120° C., and more preferably 65° C. to 90° C. The melting point being 150° C. or less can improve sealing properties, particularly degassing heat seal strength, against the electrolyte. The melting point being 60° C. or more is advantageous from the perspective of reducing or preventing development of excessively sealed portions.

Such polyolefin elastomers (B) can be used singly or in combination of two or more.

In the resin composition α, the content of the component (B) is in the range of 5 mass % to 40 mass %, preferably 10 mass % to 40 mass %, more preferably 15 mass % to 40 mass %, relative to the total solid content of the resin composition α. The content of the component (B) being 5 mass % or more can sufficiently achieve the effect of improving sealing properties, in particular degassing heat seal strength, against the electrolyte. The content of the component (B) being 40 mass % or less can reduce or prevent deterioration in heat resistance of the sealant layer 16 and development of excessively sealed portions.

If the component (B) contains the miscible polyolefin-based elastomer (B-1) and the immiscible polyolefin-based elastomer (B-2), the content ratio of the two (miscible polyolefin-based elastomer (B-1)/immiscible polyolefin-based elastomer (B-2)) is preferably in the range of 0.5 to 3, and more preferably 1 to 2 in mass ratio. The content ratio being within the above ranges can improve blushing resistance and sealing properties against the electrolyte in a well-balanced manner.

(Additive Component)

The resin composition α may further contain components besides the components (A) and (B) mentioned above. As the components besides the components (A) and (B), for example, resins such as LDPE (low density polyethylene) may be added to the resin composition α to improve take-up properties and processability. The content of other resin components to be added is preferably not more than 10 parts by mass when the total mass of the sealant layer 16 is taken to be 100 parts by mass. Components other than resins include, for example, a slip agent, anti-blocking agent, antioxidant, light stabilizer, flame retardant, and the like. The content of these other components besides resins are preferably not more than 5 parts by mass when the total mass of the sealant layer 16 is taken to be 100 parts by mass.

The presence of 1-butene in the sealant layer 16 can be verified by use of FT-IR (Fourier transform infrared spectrophotometer). The content of 1-butene can be verified by creating a calibration curve of the permeability or absorbance of the characteristic absorption band of the components (A) and (B) by using the resin composition α to which a known amount of an elastomer containing a known amount of 1-butene is added. Further, the content of 1-butene in each of the miscible polyolefin-based elastomer (B-1) and immiscible polyolefin-based elastomer (B-2) can also be verified by similarly conducting imaging in the characteristic absorption band of FT-IR, and conducting mapping by microscopic FT-IR (transmission method) in an absorption band caused by 1-butene. Besides FT-IR, the presence and content of 1-butene can be verified by dissolving the sealant layer 16 with a solvent, and measuring the solution by NMR.

The thickness of the sealant layer 16 is adjusted, for example, depending on the thickness of the second adhesive layer 17. The thickness of the sealant layer 16 is not particularly limited, but, for example, is preferably in the range of μm 5 to 100 μm, and more preferably in the range of 20 μm to 80 μm. The thickness of the sealant layer 16 may be 30 μm or less from the perspective of reducing the thickness of the packaging material. Even when thinly configured, the power storage device packaging material of the present embodiment is capable of reducing or preventing deterioration in insulation properties after degassing heat sealing.

Preferred embodiments of the power storage device packaging material of the present embodiment have been described in detail so far. However, the present invention is not limited to the specific embodiments, and can be modified or changed in various ways within the spirit of the present invention recited in the claims.

For example, FIG. 1 shows an example where the anticorrosion treatment layer 14 is formed on the second adhesive layer 17-side surface of the metal foil layer 13. However, the anticorrosion treatment layer 14 may be formed on the first adhesive layer 12-side surface of the metal foil layer 13, or may be formed on both surfaces of the metal foil layer 13. If the anticorrosion treatment layer 14 is formed on both surfaces of the metal foil layer 13, the configuration of the anticorrosion treatment layer 14 formed on the first adhesive layer 12-side surface of the of the metal foil layer 13 may be the same as or different from the configuration of the anticorrosion treatment layer 14 formed on the second adhesive layer 17-side surface of the metal foil layer 13.

FIG. 1 shows an example where the metal foil layer 13 and the sealant layer 16 are laminated through the second adhesive layer 17. However, the sealant layer 16 may be directly formed on the metal foil layer 13 without the second adhesive layer 17 being interposed, as in the power storage device packaging material 20 shown in FIG. 2 and the power storage device packaging material 30 shown in FIG. 3. The power storage device packaging material 20 shown in FIG. 2 and the power storage device packaging material 30 shown in FIG. 3 may be provided with the second adhesive layer 17 between the metal foil layer 13 and the sealant layer 16.

FIG. 1 shows an example where the sealant layer 16 is a monolayer. However, the sealant layer 16 may be a multilayer including two or more layers as in the power storage device packaging material 20 shown in FIG. 2 and the power storage device packaging material 30 shown in FIG. 3. The layers of the multilayer forming the sealant layer 16 may be the same or may be different from each other. If the sealant layer 16 is a multilayer, at least one of the layers is a propylene-based branched polymer-containing layer containing a propylene-based branched polymer having branched chains.

Figure 2:
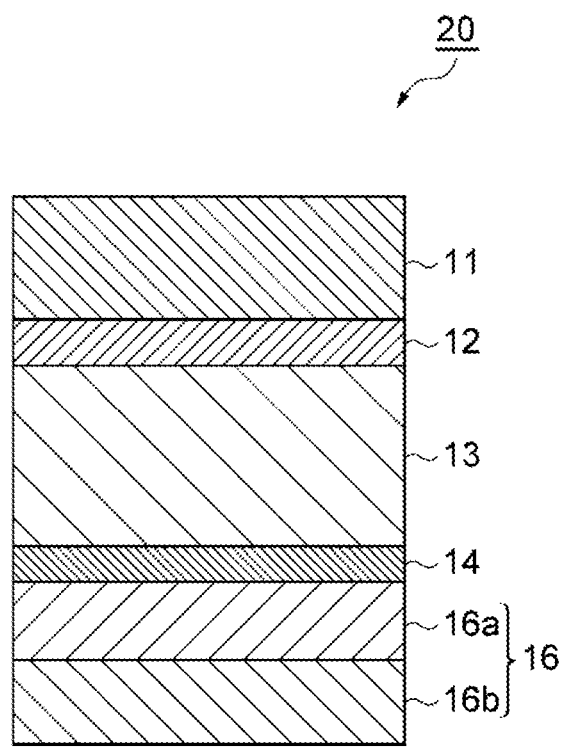
FIG. 2 is a schematic cross-sectional view illustrating a power storage device packaging material according to an embodiment of the present invention.

In the power storage device packaging material 20 shown in FIG. 2, the sealant layer 16 is configured by a first sealant layer 16a and a second sealant layer 16b. The first sealant layer 16a is the outermost layer of the sealant layer, and the second sealant layer 16b is the innermost layer of the sealant layer. At least one layer selected from the group consisting of the first sealant layer 16a and the second sealant layer 16b is a propylene-based branched polymer-containing layer that contains the propylene-based branched polymer.

The second sealant layer 16b (innermost layer) can be formed using, for example, the same constituent components as those of the sealant layer 16 of the packaging material 10 described above. The second sealant layer 16b may be formed using materials excluding the propylene-based branched polymer from the materials forming the sealant layer 16 of the packaging material 10 described above.

The thickness of the second sealant layer 16b is not particularly limited, but specifically, for example, is preferably in the range of 5 μm to 100 μm, and may be in the range of 10 μm to 30 μm from the perspective of reducing the thickness of the package.

The first sealant layer 16a (outermost layer, or metal foil-side layer) may be formed using, for example, the same constituent components as those of the second sealant layer 16b. However, in the first sealant layer 16a, it is preferable to use, for example, a resin composition containing an adhesive resin composition as a main component and, as necessary, an additive component (hereinafter may also be referred to as resin composition β) in place of the resin composition α as a base resin composition. That is, the first sealant layer 16a may be formed, for example, of the propylene-based branched polymer and the resin composition β, or may be formed of the resin composition β alone. When the first sealant layer 16a contains an adhesive resin composition, the sealant layer can be formed on the metal foil layer without an adhesive layer being interposed. If the first sealant layer 16a contains the resin composition β, the content of the adhesive resin composition relative to the total mass of the resin composition β, for example, is preferably 60 mass % or more and 95 mass % or less, and more preferably 80 mass % or more and 90 mass % or less.

[Resin Composition β (Excluding the Propylene-Based Branched Polymer)]

The adhesive resin composition in the resin composition β is not particularly limited, but may preferably contain a modified polyolefin resin (a) component and a macrophase-separated thermoplastic elastomer (b) component. The additive component preferably contains polypropylene having an atactic structure or a propylene-α-olefin copolymer (c) having an atactic structure. Each component will be described below.

(Modified Polyolefin Resin (a))

The modified polyolefin resin (a) is preferably a resin obtained by graft-modifying an unsaturated carboxylic acid derivative component derived from any one of an unsaturated carboxylic acid, acid anhydride of an unsaturated carboxylic acid, and ester of an unsaturated carboxylic acid to a polyolefin resin.

Examples of the polyolefin resin include low density polyethylene, medium density polyethylene, high density polyethylene, ethylene-α-olefin copolymers, homo-, block- or random-polypropylene, and propylene-α-olefin copolymer.

The compound used for graft-modifying these polyolefin resins may be an unsaturated carboxylic acid derivative component derived from any one of an unsaturated carboxylic acid, acid anhydride of an unsaturated carboxylic acid, and ester of an unsaturated carboxylic.

Specifically, examples of the unsaturated carboxylic acid include acrylic acid, methacrylic acid, maleic acid, fumaric acid, itaconic acid, citraconic acid, tetrahydrophthalic acid, bicyclo[2,2,1]hept-2-ene-5,6-dicarboxylic acid, and the like.

Examples of the acid anhydride of the unsaturated carboxylic acid include maleic anhydride, itaconic anhydride, citraconic anhydride, tetrahydrophthalic anhydride, bicyclo[2,2,1]hept-2-ene-5,6-dicarboxylic acid anhydride, and the like.

Examples of the esters of unsaturated carboxylic acid include methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalic anhydride, bicyclo[2,2,1]hept-2-ene-5,6-dimethyl dicarboxylate, and the like.

The modified polyolefin resin (a) can be prepared by graft polymerization (graft modification) of 0.2 to 100 parts by mass of the unsaturated carboxylic acid derivative component mentioned above relative to 100 parts by mass of a base polyolefin resin in the presence of a radical initiator. The reaction temperature of the graft modification is preferably 50° C. to 250° C., and more preferably 60° C. to 200° C. The reaction time is appropriately set depending on the production method; however, in the case of a melt graft polymerization using a biaxial extruder, for example, the reaction time is preferably within the residence time of the extruder, specifically 2 min to 30 min, and more preferably 5 min to 10 min. Graft modification can be carried out under normal pressure or pressurized conditions.

The radical initiator used for graft modification may be an organic peroxide such as alkyl peroxide, aryl peroxide, acyl peroxide, ketone peroxide, peroxy ketal, peroxy carbonate, peroxy ester, or hydroperoxide.

These organic peroxides can be appropriately selected and used depending on the conditions of the reaction temperature and the reaction time mentioned above. For example, in the case of melt graft polymerization using a biaxial extruder, alkyl peroxide, peroxy ketal, or peroxy ester is preferable, and specifically di-t-butyl peroxide, 2,5-dimethyl-2,5-di-t-butyl peroxy-hexyne-3, dicumyl peroxide, or the like is preferable.

The modified polyolefin resin (a) is preferably a polyolefin resin modified with maleic anhydride. For example, Admer manufactured by Mitsui Chemicals, Inc. Modic manufactured by Mitsubishi Chemical Corporation, or the like is suitable. Such a modified polyolefin resin (a) component excels at reactivity with various metals and polymers having various functional groups, and thus can impart adhesion to the first sealant layer 16a making use of the reactivity, and can accordingly improve electrolyte resistance.

(Macrophase-Separated Thermoplastic Elastomer (b))

The macrophase-separated thermoplastic elastomer (b) forms a macrophase-separated structure having a dispersed phase size in a range in excess of 200 nm to 50 µm or less, relative to the modified polyolefin resin (a).

By the adhesive resin composition containing a macrophase-separated thermoplastic elastomer (b) component, the residual stress can be released, which is generated during lamination of the modified polyolefin resin (a) component and the like that can be the main component of forming the first sealant layer 16a, and thermoplastic adhesion can be imparted to the first sealant layer 16a. Therefore, adhesion of the first sealant layer 16a is further improved, and the packaging material 20 having much better electrolyte resistance can be obtained.

The macrophase-separated thermoplastic elastomer (b) is present in the form of a sea-island structure on the modified polyolefin resin (a), but if the dispersed phase size is 200 nm or less, it becomes difficult to impart an improvement in viscoelastic adhesion to the first sealant layer 16a. If the dispersed phase size is in excess of 50 µm, since the modified polyolefin resin (a) is substantially immiscible with the macrophase-separated thermoplastic elastomer (b), the lamination suitability (processability) decreases considerably and it becomes easy for the material physical strength of the first sealant layer 16a to deteriorate. Therefore, the dispersed phase size is preferably in the range of 500 nm to 10 µm.

The macrophase-separated thermoplastic elastomer (b) may be, for example, a polyolefin-based thermoplastic elastomer obtained by copolymerizing ethylene and/or propylene with an α-olefin selected from 1-butene, 1-pentene, 1-hexene, 1-octene and 4-methyl-1-pentene.

Further, commercially available products can be used as the macrophase-separated thermoplastic elastomer (b) component. For example, Tafine manufactured by Mitsui Chemicals Inc., Zelas manufactured by Mitsubishi Chemical Corp., Catalloy manufactured by Montell Co, or the like is suitable.

In the resin composition β, the content of the macrophase-separated thermoplastic elastomer (b) component relative to the modified polyolefin resin (a) component is preferably in the range of 1 part by mass to 40 parts by mass, and more preferably 5 parts by mass to 30 parts by mass, relative to 100 parts by mass of the modified polyolefin resin (a) component. If the content of the macrophase-separated thermoplastic elastomer (b) component is less than 1 part by mass, improvement in adhesion of the first sealant layer cannot be expected. If the content of the macrophase-separated thermoplastic elastomer (b) component exceeds 40 parts by mass, processability is likely to be drastically lowered because miscibility is inherently low between the modified polyolefin resin (a) component and the macrophase-separated thermoplastic elastomer (b) component. Since the macrophase-separated thermoplastic elastomer (b) component is not a resin exhibiting adhesion, adhesion of the first sealant layer 16a to other layers such as the second sealant layer 16b and the anticorrosion treatment layer 14 is likely to deteriorate.

(Polypropylene Having Atactic Structure or Propylene-α-Olefin Copolymer (c) Having Atactic Structure)

It is preferable that the resin composition β contains polypropylene having an atactic structure or a propylene-α-olefin copolymer having an atactic structure (hereinafter simply referred to as component (c)) as an additive component. The component (c) herein is a perfect amorphous resin component. The resin composition β may contain both polypropylene having an atactic structure and propylene-α-olefin copolymer having an atactic structure.

Hereinafter, a description will be given of the effect of adding the additive component (c) to the adhesive resin composition as a main component, in the resin composition R.

In a molten state, the component (c) is miscible with the modified polyolefin resin (a) component in the adhesive resin composition, but it is discharged to the outside of the crystal during crystallization accompanying cooling, and undergoes separation. As a result, the component (c) does not interfere with the degree of crystallization of the modified polyolefin resin (a) component in the adhesive resin composition as a main component. By adding the component (c) to the resin composition β, the concentration of the modified polyolefin resin (a) component is diluted by the component (c) to minimize crystal growth, thereby reducing the crystal size (spherulite size) of the adhesive component (i.e., the modified polyolefin resin (a) component) of the base resin. Moreover, the component (c) discharged outside the crystal is uniformly dispersed around the micro-spherulites of the modified polyolefin resin (a) component.

It is known that a blushing phenomenon occurs when cold-forming a packaging material. The mechanism of the blushing phenomenon will be described.

(1) The modified polyolefin resin (a) in the resin composition β is crystallized by heat treatment at the time of thermal lamination.

(2) Since the modified polyolefin resin (a) is immiscible with the macrophase-separated thermoplastic elastomer (b), strain develops at the interface between the two due to the crystallization behavior of (1).

(3) With the application of stress when formed, cracks occur at the interface between the two to form voids and crazes.

(4) Light is scattered by the voids and craze 15c and the blushing phenomenon occurs due to the irregular reflection of optical light.

Specifically, to prevent the blushing phenomenon, it is known to be important that the crystallization of the modified polyolefin resin (a) does not progress due to the amount of heat generated during thermal lamination (i.e., crystallization is minimized), and the adhesion between the modified polyolefin resin (a) and the macrophase-separated thermoplastic elastomer (b) is improved.

In this regard, by adding the component (c) as an additive component to the adhesive resin composition that can be the main component of the first sealant layer 16a, the crystal size (spherulite size) of the modified polyolefin resin (a) component can be reduced, and therefore flexible and strong film properties are obtained. Moreover, since the component (c) is uniformly dispersed around the modified polyolefin resin (a), stress is uniformly relieved and development of voids and crazes is reduced or prevented. These effects are considered to alleviate the blushing phenomenon occurring on the packaging material 20 due to the stress generated at the time of forming.

As described above, addition of the component (c) as an additive component to the adhesive resin composition that can be the main component of the first sealant layer 16a, can enhance transparency of the first sealant layer 16a and alleviate the blushing phenomenon due to the stress generated at the time of forming. Thus, blushing during forming also improves, leading to improvement in insulating properties associated with the bending stress (bending resistance) of the packaging material 20. Moreover, while maintaining the degree of crystallization of the modified polyolefin resin component (a), the first sealant layer 16a is imparted with flexibility, so that deterioration in lamination strength is reduced or prevented during electrolyte swelling of the packaging material 20.

(Propylene-α-Olefin Copolymer (d) Having Isotactic Structure)

In addition to the component (c) mentioned above, the resin composition β may further contain a propylene-α-olefin copolymer having an isotactic structure (hereinafter simply referred to as component (d)) as an additive component.

The component (d) acts as a miscible rubber component, when the modified polyolefin resin (a) in the adhesive resin component as the main component of the resin composition β is specifically a polypropylene-based adhesive resin, and minimizes crystallization of the modified polyolefin resin (a).

That is, with further addition of the component (d) as an additive component to the adhesive resin component as the main component of the resin composition β, flexibility for alleviating stress can be imparted to the layer. Therefore, heat seal strength (in particular, electrolyte resistance) and degassing heat seal strength are improved, and deterioration in electrolyte lamination strength is reduced or prevented. Further, the blushing phenomenon and bending insulation resistance can be further improved by combining the components (c) and (d) as additive components.

In the resin composition β, the total mass of the components (a) and (b) may be, for example, 60 mass % or more and 95 mass % or less, or may be 80 mass % or more and 90 mass % or less, relative to the total mass of the first sealant layer 16a.

In the resin composition β, the total mass of the components (c) and (d) is, for example, preferably 5 mass % or more and 40 mass % or less, relative to the total mass of the components (a), (b), (c) and (d). When the total mass of the components (c) and (d) is less than 5 mass % relative to the total mass of the components (a), (b), (c) and (d), the effects mentioned above produced by adding an additive are unlikely to be obtained sufficiently. If the total mass of the components (c) and (d) exceeds 40 mass % relative to the total mass of the components (a), (b), (c) and (d), adhesion of the first sealant layer 16a to other layers such as the second sealant layer 16b and the anticorrosion treatment layer 14 is likely to deteriorate. From these perspectives, in the resin composition β, the total mass of the components (a) and (b), for example, is preferably 60 mass % to 95 mass %, relative to the total mass of the components (a), (b), (c) and (d).

The method of analyzing the component (c) which is an additive component in the resin composition β, may, for example, be quantification through stereoregularity assessment which is based on nuclear magnetic resonance spectroscopy (NMR).

The component (d) can be analyzed using Fourier transform infrared spectroscopy (FT-IR), and the formulation ratio can be verified by creating a calibration curve using an absorber attributed to the branching of α-olefin, and an absorber attributed to the specific absorber of the modified polyolefin resin (a).

Besides the adhesive resin composition (i.e., the modified polyolefin resin (a) component and the macrophase-separated thermoplastic elastomer (b) component) and the additive component (i.e., the components (c) and (d)), the resin composition β may contain various additives such as a flame retardant, slip agent, antiblocking agent, antioxidant, light stabilizer, tackifier, and the like, as required.

The thickness of the first sealant layer 16a is not particularly limited, but may preferably be equal to or less than that of the second sealant layer 16b, from the perspective of stress relaxation and moisture/electrolyte permeation.

In the power storage device packaging material 20 as well, the thickness of the sealant layer 16 (i.e., the total thickness of the first and second sealant layers 16a and 16b) may be 30 μm or less from the perspective of reducing the thickness of the package. Even when thinly configured, the power storage device packaging material of the present embodiment is capable of reducing or preventing deterioration in insulation properties after degassing heat sealing.

FIG. 2 shows an example where the sealant layer 16 is formed of two layers. However, the sealant layer 16 may be formed of three layers as in the power storage device packaging material 30 shown in FIG. 3. In the power storage device packaging material 30 shown in FIG. 3, the sealant layer 16 includes a first sealant layer 16a, a second sealant layer 16b, and a third sealant layer 16c. The first sealant layer 16a is the outermost layer (metal foil-side layer) of the sealant layer, the third sealant layer 16c is an intermediate layer of the sealant layer, and the second sealant layer 16b is the innermost layer of the sealant layer. At least one layer selected from the group consisting of these three layers is a propylene-based branched polymer-containing layer that contains the propylene-based branched polymer.

Examples and preferred modes of the materials forming the first sealant layer 16a of the power storage device packaging material 30 are similar to those of the first sealant layer 16a of the power storage device packaging material 20.

Examples and preferred modes of the materials forming the second and third sealant layers 16b and 16c of the power storage device packaging material 30 are similar to those of the second sealant layer 16b of the power storage device packaging material 20.

In the power storage device packaging material 30, the first sealant layer 16a may have a thickness, for example, in the range of 2 μm to 30 μm, or 5 μm to 20 μm, or 8 μm to 10 μm, the second sealant layer 16b may have a thickness, for example, in the range of 10 μm to 80 μm, or 13 μm to 40 μm, or 15 μm to 20 μm, and the third sealant layer 16c may have a thickness, for example, in the range of 2 μm to 30 μm, or 5 μm to 20 μm, or 8 μm to 10 μm.

In the power storage device packaging material 30 as well, the thickness of the sealant layer 16 (the total thickness of the first, second and third sealant layers 16a, 16b and 16c) may be 30 μm or less from the perspective of reducing the thickness of the packaging material. Even when thinly configured, the power storage device packaging material of the present embodiment is capable of reducing or preventing deterioration in insulation properties after degassing heat sealing.

In any of the power storage device packaging materials 10, 20 and 30, the content of the propylene-based branched polymer in the sealant layer may be, for example, 0.1 mass % to 80 mass %, or may be 1.0 mass % to 50.0 mass %, or may be 10.0 mass % to 30.0 mass %, relative to the total mass of the sealant layer, from the perspective of further reducing or preventing deterioration in insulation properties after degassing heat sealing and of further improving degassing heat seal strength while maintaining electrolyte properties and blushing resistance. If the sealant layer is formed of more than one layer, the content of the propylene-based branched polymer in each layer of the propylene-based branched polymer-containing layer may be, for example, more than 0 mass % and 85 mass % or less, or may be 1 mass % or more and 75 mass % or less, or may be 3 mass % or more and 40 mass % or less.

Figure 3:
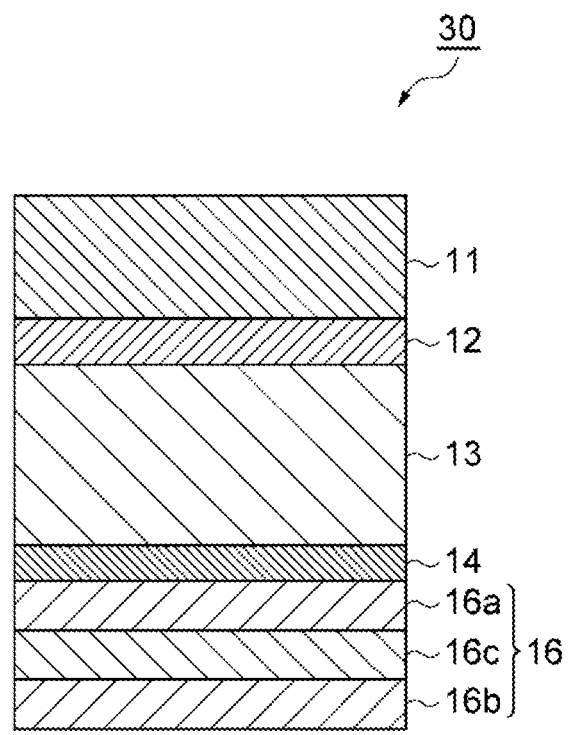
FIG. 3 is a schematic cross-sectional view illustrating a power storage device packaging material according to an embodiment of the present invention.

Moreover, for example, if the sealant layer is formed of more than one layer as in the power storage device packaging material shown in FIGS. 2 and 3, at least one of the layers may be a propylene-based branched polymer-containing layer. However, from the perspective of further reducing or preventing deterioration in insulation properties and keeping good insulation properties for a longer period of time, the layer closest to the metal foil layer is preferably the propylene-based branched polymer-containing layer. If the layer closest to the metal foil layer is the propylene-based branched polymer-containing layer, it is preferable that the propylene-based branched polymer-containing layer closest to the metal foil layer further contains acid-modified polypropylene, and polypropylene having an atactic structure or a propylene-α-olefin copolymer having an atactic structure, from the perspective of further reducing or preventing deterioration in lamination strength and insulation properties against the electrolyte.

[Method for Producing Packaging Material]

Next, an example of a method of producing the packaging material 10 shown in FIG. 1 will be described. Method of producing the packaging material 10 is not limited to the following one.

The method of producing the packaging material 10 of the present embodiment includes a step of laminating the anticorrosion treatment layer 14 on the metal foil layer 13, a step of bonding the substrate layer 11 and the metal foil layer 13, a step of preparing a laminate by further laminating the sealant layer 16 via the second adhesive layer 17, and, if necessary, a step of aging the resultant laminate.

(Step of Laminating Anticorrosion Treatment Layer 14 on Metal Foil Layer 13)

In the present step, the anticorrosion treatment layer 14 is formed on the metal foil layer 13. As described above, the method may include applying a degreasing treatment, hydrothermal modification treatment, anodic oxidation treatment, or chemical conversion treatment to the metal foil layer 13, or applying a coating agent having a corrosion prevention performance onto the metal foil layer 13.

If the anticorrosion treatment layer 14 is a multilayer, for example, a coating liquid (coating agent) that serves as a lower layer-side (metal foil layer 13-side) anticorrosion treatment layer may be applied to the metal foil layer 13, followed by baking to form a first layer, and then, a coating liquid (coating agent) that serves as an upper layer-side anticorrosion treatment layer may be applied to the first layer, followed by baking to form a second layer.

The degreasing treatment may be carried out by spraying and immersion. The hydrothermal modification treatment and the anodic oxidation may be carried out by immersion. The chemical conversion treatment may be selected from among immersion, spraying and coating, depending on the type of chemical conversion treatment.

Various methods such as gravure coating, reverse coating, roll coating or bar coating may be used as the method of applying the coating agent having corrosion prevention performance.

As described above, the various treatments may be applied to either side or both sides of the metal foil. In the case of a single-side treatment, the treatment is preferably applied to the surface on which the second adhesive layer 17 is laminated. If needed, the treatment mentioned above may also be applied to the surface of the substrate layer 11.

The amounts of the coating agents for forming the first and second layers are preferably both in the range of 0.005 g/m2 to 0.200 g/m2, more preferably 0.010 g/m2 to 0.100 g/m2.

If necessary, dry curing may be carried out within a base material temperature range of 60° C. to 300° C. depending on the drying conditions of the corrosion inhibition treatment layer 14 used.

(Step of Bonding Substrate Layer 11 and Metal Foil Layer 13)

In the present step, the metal foil layer 13 provided with the corrosion preventing treatment layer 14 is bonded to the substrate layer 11 via the first adhesive layer 12. The bonding method uses a technique such as dry lamination, non-solvent lamination or wet lamination, and bonds the two layers using the material forming the aforementioned first adhesive layer 12. The adhesive layer 12 is provided in the range of 1 g/m2 to 10 g/m2, and more preferably in the range of 3 g/m2 to 7 g/m2 in terms of dry coating amount.

(Step of Laminating Second Adhesive Layer 17 and Sealant Layer 16)

In the present step, the sealant layer 16 is bonded to the anticorrosion treatment layer 14-side of the metal foil layer 13 via the second adhesive layer 17. The bonding method may be wet processing, dry lamination, or the like.

If wet processing is used, a solution or a dispersion of the adhesive forming the second adhesive layer 17 is applied onto the anticorrosion treatment layer 14 and the solvent is vaporized at a predetermined temperature (if the adhesive contains an acid-modified polyolefin resin, the temperature is not less than its melting point), followed by dry, which may be further followed by baking, if necessary, to thereby form a film. Then, the sealant layer 16 is laminated, thereby preparing the packaging material 10. The coating method may be any of the various coating methods mentioned above.

(Step of Aging)

In the present step, the laminate is aged (cured). Aging of the laminate can expedite adhesion between the metal foil layer 13/the anticorrosion treatment layer 14/the second adhesive layer 17/the sealant layer 16. Aging may be conducted in the range of room temperature to 100° C. Aging time is, for example, 1 day to 10 days. To bond the second adhesive layer 17 with the sealant layer 16, heat treatment may be conducted at a temperature not less than the melting point of the second adhesive layer 17. The heat treatment may include, but is not limited to, oven heating, sandwiching with heated rolls (thermal lamination), winding on a heated roll, or the like.

In this manner, there can be produced the packaging material 10 of the present embodiment as shown in FIG. 1.

Next, an example of a method of producing the packaging material 20 shown in FIG. 2 will be described. The method of producing the packaging material 20 is not limited to the following one.

The method of producing the packaging material 20 of the present embodiment includes a step of laminating the anticorrosion treatment layer 14 on the metal foil layer 13, a step of bonding the substrate layer 11 and the metal foil layer 13, a step of further laminating the first sealant layer 16a and the second sealant layer 16b to prepare a laminate, and, if necessary, a step of heating the resultant laminate. Steps up to the step of bonding the substrate layer 11 and the metal foil layer 13 can be performed in the same manner as in the method of producing the packaging material 10.

(Step of Laminating First Sealant Layer 16a and Second Sealant Layer 16b)

In the present step, the first sealant layer 16a and the second sealant layer 16b are formed on the anticorrosion treatment layer 14 formed in the previous step. The method includes sandwich-laminating the first sealant layer 16a and the second sealant layer 16b using an extrusion laminator. Lamination can be conducted by a tandem lamination method or a coextrusion method where the first sealant layer 16a and the second sealant layer 16b are extruded. The resin composition for forming the first sealant layer 16a and the resin composition for forming the second sealant layer 16b can be prepared by formulating individual components, for example, so as to meet the configurations of the first and second sealant layers 16a and 16b described above.

According to the present step, there can be obtained a laminate, as shown in FIG. 2, where the substrate layer 11/the first adhesive layer 12/the metal foil layer 13/the corrosion inhibition treatment layer 14/the first sealant layer 16a/the second sealant layer 16b are laminated in this order.

When laminating the first sealant layer 16a, materials that are dry-blended so as to have the composition of the material formulation mentioned above may be directly laminated using an extrusion laminator, or granules of the first sealant layer 16a obtained in advance by melt-blending materials using a melt kneading device such as a single-screw extruder, twin-screw extruder or Brabender mixer may be laminated using an extrusion laminator.

When laminating the second sealant layer 16b, materials that are dry-blended so as to have the composition of the material formulation mentioned above, as a resin composition for forming a sealant layer, may be directly laminated using an extrusion laminator, or granules obtained in advance by melt-blending materials using a melt kneading device such as a single-screw extruder, twin-screw extruder or Brabender mixer may be laminated using an extrusion laminator by a tandem lamination method or coextrusion of extruding the first and second sealant layers 16a and 16b. Moreover, a sealant monolayer film may be formed in advance as a cast film using a resin composition for forming a sealant layer, and the film may be laminated by sandwich-lamination together with an adhesive resin, or may be laminated by dry lamination method using an adhesive.

(Step of Heating)

In the present step, the laminate is heat-treated. Heat treatment of the laminate can improve adhesion between the metal foil layer 13/the corrosion preventing treatment layer 14/the first sealant layer 16a/the second sealant layer 16b, and impart better electrolyte resistance or hydrofluoric acid resistance to the laminate. Also, heat treatment of the laminate exerts an effect of controlling crystallization of the first and second sealant layers 16a and 16b, and improving insulation properties after forming. Therefore, in the present step, it is preferable to improve adhesion between the layers mentioned above, and conduct heat treatment appropriate for crystallization of the first and second sealant layers 16a and 16b. As the method, description provided above may be referred to. In the method, however, it is preferable that the treatment is conducted at least at a temperature of not less than the melting point of the first sealant layer 16a.

In this manner, the packaging material 20 of the present embodiment as shown in FIG. 2 can be prepared.

Next, an example of the method of producing the packaging material 30 shown in FIG. 3 will be described. Method of producing the packaging material 30 is not limited to the following one.

The method of producing the packaging material 30 of the present embodiment includes a step of laminating the anticorrosion treatment layer 14 on the metal foil layer 13, a step of bonding the substrate layer 11 and the metal foil layer 13, a step of further laminating the first sealant layer 16a, the third sealant layer 16c, and the second sealant layer 16b to prepare a laminate, and, if necessary, a step of heating the resultant laminate.

(Step of Laminating First Sealant Layer 16a, Third Sealant Layer 16c and Second Sealant Layer 16b)

In the present step, the first sealant layer 16a, the third sealant layer 16c and the second sealant layer 16b are formed on the anticorrosion treatment layer 14. The method may be a tandem lamination method or a coextrusion method of extruding the first sealant layer 16a, the third sealant layer 16c and the second sealant layer 16b using an extrusion laminator. In this case, materials that are dry-blended so as to have a composition of the material formulation mentioned above, as a resin composition for forming a sealant layer, may be directly laminated using an extrusion laminator, or granules obtained in advance by melt-blending materials using a melt kneading device such as a single-screw extruder, twin-screw extruder or Brabender mixer may be laminated using an extrusion laminator by a tandem lamination method or coextrusion of extruding the first, third and second sealant layers 16a, 16c and 16b.

Films of the third and second sealant layers 16c and 16b may be formed by coextrusion and these films may be sandwich-laminated together with a resin composition for forming the first sealant layer 16a.

In this manner, the packaging material 30 of the present embodiment as shown in FIG. 3 can be prepared.

Preferred embodiments of the power storage device packaging material and the production method of the present invention have been described in detail so far. The present invention should not be construed as being limited to such specific embodiments but may be variously modified and altered within the spirit of the present invention recited in the claims. For example, if a power storage device packaging material not having the first adhesive layer 12 is produced, the substrate layer 11 may be formed, as described above, by applying a resin material capable of forming the substrate layer 11 onto the metal foil layer 13.

The power storage device packaging material of the present invention can be conveniently used as a packaging material for power storage devices including, for example, secondary batteries such as a lithium ion battery, a nickel hydrogen battery and a lead storage battery, and electrochemical capacitors such as an electric double layer capacitor. In particular, the power storage device packaging material of the present invention is preferable as a packaging material for a lithium ion battery.

EXAMPLES

In the following, the present invention will be described in more detail by way of examples. However, the present invention should not be limited to the following examples.

[Materials Used]

Materials used in examples and comparative example are set forth below.

<Substrate Layer (15-μm Thickness)>

Nylon (Ny) film (manufactured by Toyobo Co., Ltd.) was used.

<First Adhesive Layer (4-μm Thickness)>

A polyurethane adhesive (manufactured by Toyo Ink Co., Ltd.) was used, containing a polyester polyol-based main resin to which a tolylene diisocyanate adduct curing agent was added.

<First Anticorrosion Treatment Layer (Substrate Layer Side)>

(CL-1): A Sodium polyphosphate stabilized cerium oxide sol was used after being adjusted to a solid content concentration of 10 mass % by using distilled water as a solvent. It should be noted that the sodium polyphosphate stabilized cerium oxide sol was obtained by formulating 10 parts by mass of Na salt of phosphoric acid per 100 parts by mass of cerium oxide.

(CL-2): A composition comprising 90 mass % of polyallylamine (manufactured by Nitto Boseki Co., Ltd) and 10 mass % of polyglycerol polyglycidyl ether (manufactured by Nagase Chemtex Corp.) was used after being adjusted to a solid concentration of 5 mass % using distilled water as a solvent.

(CL-3): A chemical conversion treatment agent was used, which was prepared by adjusting a water-soluble phenol resin (Sumitomo Bakelite Co., Ltd.) having a solid concentration of 1 mass %, so that the content of the chromium fluoride (CrF3), as a Cr content, in the final dry coating film would be 10 mg/m2, by using an aqueous phosphoric acid solution with a concentration of 1 mass % as a solvent.

<Metal Foil Layer (35-μm Thickness)>

Annealed and degreased soft aluminum foil (8079 Material manufactured by Toyo Aluminum K.K.) was used.

<Second Anticorrosion Treatment Layer (Sealant Layer Side)>

(CL-1): A Sodium polyphosphate stabilized cerium oxide sol was used after being adjusted to a solid content concentration of 10 mass % by using distilled water as a solvent. It should be noted that the sodium polyphosphate stabilized cerium oxide sol was obtained by formulating 10 parts by mass of Na salt of phosphoric acid per 100 parts by mass of cerium oxide.

(CL-2): A composition comprising 90 mass % of polyallylamine (manufactured by Nitto Boseki Co., Ltd) and 10 mass % of polyglycerol polyglycidyl ether (manufactured by Nagase Chemtex Corp.) was used after being adjusted to a solid concentration of 5 mass % using distilled water as a solvent.

(CL-3): A chemical conversion treatment agent was used, which was prepared by adjusting a water-soluble phenol resin (Sumitomo Bakelite Co., Ltd.) having a solid concentration of 1 mass %, so that the content of the chromium fluoride (CrF3), as a Cr content, in the final dry coating film would be 10 mg/m2, by using an aqueous phosphoric acid solution with a concentration of 1 mass % as a solvent.

<Second Adhesive Layer (3-μm Thickness)>

The following adhesives A and B were prepared as adhesives for forming the second adhesive layer.

(Adhesive A): An adhesive obtained by formulating 10 parts by mass (solid content ratio) of a polyisocyanate compound having an isocyanurate structure per 100 parts by mass of a maleic anhydride-modified polyolefin resin dissolved in toluene.

(Adhesive B): A polyurethane adhesive prepared by formulating a polyester polyol comprising a hydrogenated dimer fatty acid and a diol, and a polyisocyanate at a molar ratio (NCO/OH) of 2.

<Sealant Layer>

[Base Resin Composition]

The following resins A, B and C were prepared as base resin compositions for forming the sealant layer.

(Resin A): A mixture obtained by mixing the following materials at a mass ratio of AR-1:AR-2=75:25. It should be noted that this mixture corresponds to the resin composition β.

(AR-1): Random polypropylene (PP)-based acid-modified polypropylene resin composition (Admer manufactured by Mitsui Chemicals, Inc.) containing ethylene-propylene rubber as immiscible rubber.

(AR-2): A propylene-α-olefin copolymer having an atactic structure (Tafthren H manufactured by Sumitomo Chemical Co., Ltd.).

(Resin B): A resin composition prepared by mixing the following materials at a mass ratio of (A):(B-1):(B-2)=70:20:10. It should be noted that this mixture corresponds to the resin composition α.

Component (A) (Random PP): Propylene-ethylene random copolymer having a melting point of 140° C. (Prime Polypro manufactured by Prime Polymer Co., Ltd.).

Component (B-1) (Propylene-1-butene): A propylene-1-butene random copolymer elastomer (TAFMER XM manufactured by Mitsui Chemicals, Inc.) having a melting point of 85° C. and miscible with the component (A).

Component (B-2) (Ethylene-1-butene): Ethylene-1-butene random copolymer elastomer (EXCELLEN manufactured by Sumitomo Chemical Co., Ltd.) having a melting point of 75° C. and immiscible with the component (A).

(Resin C): (AR-1) set forth above It should be noted that resin C corresponds to the resin composition β.

[Propylene-Based Branched Polymer]

The following branched polymers A, B, C and D were prepared as propylene-based branched polymers.

(Branched polymer A): A propylene-ethylene random copolymer with branched chains having 500 or more carbons (random PP).

(Branched polymer B): A propylene-1-butene copolymer (propylene-α-olefin copolymer) with branched chains having 500 or more carbons (thermoplastic elastomer).

(Branched polymer C): Homopolypropylene with branched chains having 500 or more carbons (homo PP).

(Branched Polymer D): Block polypropylene with branched chains having 500 or more carbons (block PP).

Example 1

First, the first and second anticorrosion treatment layers were provided on the metal foil layer through the following procedure. That is, (CL-1) was applied to both surfaces of the metal foil layer by micro gravure coating at a dry coating weight of 70 mg/m2, followed by baking at 200° C. in a drying unit. Next, (CL-2) was applied to the obtained layer by micro gravure coating at a dry coating weight of 20 mg/m2, thereby forming a composite layer of (CL-1) and (CL-2) as first and second anticorrosion treatment layers. The composite layer developed corrosion prevention performance by compounding two materials (CL-1) and (CL-2).

Next, the first anticorrosion treatment layer side of the metal foil layer provided with the first and second anticorrosion treatment layers was dry-laminated to a substrate layer using a polyurethane-based adhesive (first adhesive layer). The resultant laminate was loaded on an unwinding unit of an extrusion laminator and coextrusion was conducted with respect to the second anticorrosion treatment layer under processing conditions of 290° C. and 100 m/min, thereby laminating a metal foil side layer (hereinafter also referred to as AL side layer) (having a thickness of 10 μm) and an innermost layer (having a thickness 20 μm) in this order as a sealant layer. Note that, for the AL side layer and the innermost layer, compounds of various materials were prepared in advance using a biaxial extruder, followed by water cooling and pelletizing steps, so as to be used for the extrusion lamination mentioned above. For forming the AL side layer, a mixture of resin A (corresponding to resin composition β) and branched polymer A was used. The content of the branched polymer A in the AL side layer was 1 mass % relative to the total mass of the AL side layer (corresponding to the sealant layer 16a). For forming the innermost layer (corresponding to the sealant layer 16b), resin B (corresponding to the resin composition α) was used.

The laminate obtained in this way was heat-treated so that the maximum temperature reached of the laminate would be 190° C. to prepare a packaging material of Example 1 (laminate of substrate layer/first adhesive layer/first anticorrosion treatment layer/metal foil layer/second anticorrosion treatment layer/AL side layer (sealant layer 16a)/innermost layer (sealant layer 16b)). In the present example, the AL side layer (sealant layer 16a) was the propylene-based branched polymer-containing layer.

Example 2

A packaging material of Example 2 was prepared in the same manner as in Example 1 except that the content of the branched polymer A in the AL side layer (sealant layer 16a) was 3 mass % relative to the total mass of the AL side layer (sealant layer 16a). In the present example, the AL side layer (sealant layer 16a) was the propylene-based branched polymer-containing layer.

Example 3

A packaging material of Example 3 was prepared in the same manner as in Example 1 except that the content of the branched polymer A in the AL side layer (sealant layer 16a) was 10 mass % relative to the total mass of the AL side layer (sealant layer 16a). In the present example, the AL side layer (sealant layer 16a) was the propylene-based branched polymer-containing layer.

Example 4

A packaging material of Example 4 was prepared in the same manner as in Example 1 except that the resin used for forming the AL side layer (sealant layer 16a) was changed to the resin A (resin composition β), and that the resin used for forming the innermost layer (sealant layer 16b) was changed to a mixture of the resin B (resin composition α) and the branched polymer A. The content of the branched polymer A in the innermost layer was 2 mass % relative to the total mass of the innermost layer (sealant layer 16b). In the present example, the innermost layer (sealant layer 16b) was the propylene-based branched polymer-containing layer.

Example 5

A packaging material of Example 5 was prepared in the same manner as in Example 4 except that the content of the branched polymer A in the innermost layer (sealant layer 16b) was 6 mass % relative to the total mass of the innermost layer (sealant layer 16b). In the present example, the innermost layer (sealant layer 16b) was the propylene-based branched polymer-containing layer.

Example 6

A packaging material of Example 6 was prepared in the same manner as in Example 4 except that the content of the branched polymer A in the innermost layer (sealant layer 16b) was 20 mass % relative to the total mass of the innermost layer (sealant layer 16b). In the present example, the innermost layer (sealant layer 16b) was the propylene-based branched polymer-containing layer.

Example 7

A packaging material of Example 7 was prepared in the same manner as in Example 4 except that the content of the branched polymer A in the innermost layer (sealant layer 16b) was set to 40 mass % relative to the total mass of the innermost layer (sealant layer 16b). In the present example, the innermost layer (sealant layer 16b) was the propylene-based branched polymer-containing layer.

Example 8

A packaging material of Example 8 was prepared in the same manner as in Example 4 except that the content of the branched polymer A in the innermost layer (sealant layer 16b) was 75 mass % relative to the total mass of the innermost layer (sealant layer 16b). In the present example, the innermost layer (sealant layer 16b) was the propylene-based branched polymer-containing layer.

Example 9

A packaging material of Example 9 was prepared in the same manner as in Example 1 except that the resin used for forming the innermost layer (sealant layer 16b) was changed to a mixture of the resin B (resin composition α) and the branched polymer A. The content of the branched polymer A in the innermost layer (sealant layer 16b) was 2 mass % relative to the total mass of the innermost layer (sealant layer 16b). In the present example, the AL side layer (sealant layer 16a) and the innermost layer (sealant layer 16b) were the propylene-based branched polymer-containing layers.

Example 10

A packaging material of Example 10 was prepared in the same manner as in Example 9 except that the content of the branched polymer A in the AL side layer (sealant layer 16a) was 3 mass % relative to the total mass of the AL side layer (sealant layer 16a), and that the content of the branched polymer A in the innermost layer (sealant layer 16b) was 6 mass % relative to the total mass of the innermost layer (sealant layer 16b). In the present example, the AL side layer (sealant layer 16a) and the innermost layer (sealant layer 16b) were the propylene-based branched polymer-containing layers.

Example 11

A packaging material of Example 11 was prepared in the same manner as in Example 9 except that the content of the branched polymer A in the AL side layer (sealant layer 16a) was 3 mass % relative to the total mass of the AL side layer (sealant layer 16a), and that the content of the branched polymer A in the innermost layer (sealant layer 16b) was 20 mass % relative to the total mass of the innermost layer (sealant layer 16b). In the present example, the AL side layer (sealant layer 16a) and the innermost layer (sealant layer 16b) were the propylene-based branched polymer-containing layers.

Example 12

A packaging material of Example 12 was prepared in the same manner as in Example 9 except that the content of the branched polymer A in the AL side layer (sealant layer 16a) was 3 mass % relative to the total mass of the AL side layer (sealant layer 16a), and that the content of the branched polymer A in the innermost layer (sealant layer 16b) was 40 mass % relative to the total mass of the innermost layer (sealant layer 16b). In the present example, the AL side layer (sealant layer 16a) and the innermost layer (sealant layer 16b) were the propylene-based branched polymer-containing layers.

Example 13

A packaging material of Example 13 was prepared in the same manner as in Example 9 except that the content of the branched polymer A in the AL side layer (sealant layer 16a) was 3 mass % relative to the total mass of the AL side layer (sealant layer 16a), and that the content of the branched polymer A in the innermost layer (sealant layer 16b) was 75 mass % relative to the total mass of the innermost layer (sealant layer 16b). In the present example, the AL side layer (sealant layer 16a) and the innermost layer (sealant layer 16b) were the propylene-based branched polymer-containing layers.

Example 14

The first and second anticorrosion treatment layers were provided to the metal foil layer in the same manner as in Example 1. The first anticorrosion treatment layer side of the metal foil layer provided with the first and second anticorrosion treatment layers was dry-laminated to a substrate layer using a polyurethane-based adhesive (first adhesive layer). The resultant laminate was loaded on an unwinding unit of an extrusion laminator and coextrusion was conducted with respect to the second anticorrosion treatment layer under processing conditions of 290° C. and 100 m/min, thereby laminating an AL side layer (sealant layer 16a) (having a thickness of 10 μm), an intermediate layer (sealant layer 16c) (having a thickness of 10 μm) and an innermost layer (sealant layer 16b) (having a thickness 10 μm) in this order as a sealant layer. Note that, for the AL side layer (sealant layer 16a), the intermediate layer (sealant layer 16c) and the innermost layer (sealant layer 16b), compounds of various materials were prepared in advance using a biaxial extruder, followed by water cooling and pelletizing steps, so as to be used for the extrusion lamination mentioned above. The resin A (resin composition β) was used for forming the AL side layer (sealant layer 16a), a mixture of the resin B (resin composition α) and the branched polymer A was used for forming the intermediate layer (sealant layer 16c), and the resin B (resin composition α) was used for forming the innermost layer (sealant layer 16b). The content of the branched polymer A in the intermediate layer (sealant layer 16c) was 6 mass % relative to the total mass of the intermediate layer (sealant layer 16c).

The laminate obtained in this way was heat-treat through heat lamination so that the maximum temperature reached of the laminate would be 190° C., to prepare a packaging material of Example 14 (laminate of substrate layer/first adhesive layer/first anticorrosion treatment layer/metal foil layer/second anticorrosion treatment layer/AL side layer (sealant layer 16a)/intermediate layer (sealant layer 16c)/innermost layer (sealant layer 16b)). In the present example, the intermediate layer (sealant layer 16c) was the propylene-based branched polymer-containing layer.

Example 15

A packaging material of Example 15 was prepared in the same manner as in Example 14 except that the resin used for forming the AL side layer (sealant layer 16a) was changed to a mixture of the resin A (resin composition β) and the branched polymer A. The content of the branched polymer A in the AL side layer (sealant layer 16a) was 3 mass % relative to the total mass of the AL side layer (sealant layer 16a). In the present example, the AL side layer (sealant layer 16a) and the intermediate layer (sealant layer 16c) were the propylene-based branched polymer-containing layers.

Example 16

A packaging material of Example 16 was prepared in the same manner as in Example 14 except that the resin used for forming the AL side layer (sealant layer 16a) was changed to a mixture of the resin A (resin composition β), and the branched polymer A, that the resin used for forming the intermediate layer (sealant layer 16c) was changed to the resin B (resin composition α), and that the resin used for forming the innermost layer (sealant layer 16b) was changed to a mixture of the resin B (resin composition α) and the branched polymer A. The content of the branched polymer A in the AL side layer (sealant layer 16a) was 3 mass % relative to the total mass of the AL side layer (sealant layer 16a), and the content of the branched polymer A in the innermost layer (sealant layer 16b) was 6 mass % relative to the total mass of the innermost layer (sealant layer 16b). In the present example, the AL side layer (sealant layer 16a) and the innermost layer (sealant layer 16b) were the propylene-based branched polymer-containing layers.

Example 17

A packaging material of Example 17 was prepared in the same manner as in Example 1 except that the resin used for forming the AL side layer (sealant layer 16a) was changed to a mixture of the resin C (resin composition β) and the branched polymer A. The content of the branched polymer A in the AL side layer (sealant layer 16a) was 10 mass % relative to the total mass of the AL side layer (sealant layer 16a). In the present example, the AL side layer (sealant layer 16a) was the propylene-based branched polymer-containing layer.

Example 18

A packaging material of Example 18 was prepared in the same manner as in Example 1 except that the resin used for forming the AL side layer (sealant layer 16a) was changed to a mixture of the resin A (resin composition β) and the branched polymer B. The content of the branched polymer B in the AL side layer (sealant layer 16a) was 10 mass % relative to the total mass of the AL side layer (sealant layer 16a). In the present example, the AL side layer (sealant layer 16a) was the propylene-based branched polymer-containing layer.

Example 19

A packaging material of Example 19 was prepared in the same manner as in Example 1 except that the resin used for forming the AL side layer (sealant layer 16a) was changed to a mixture of the resin A (resin composition β) and the branched polymer B, and that the resin used for forming the innermost layer (sealant layer 16b) was changed to a mixture of the resin B (resin composition α) and the branched polymer B. The content of the branched polymer B in the AL side layer (sealant layer 16a) was 3 mass % relative to the total mass of the AL side layer (sealant layer 16a), and the content of the branched polymer B in the innermost layer (sealant layer 16b) was 6 mass % relative to the total mass of the innermost layer (sealant layer 16b). In the present example, the AL side layer (sealant layer 16a) and the innermost layer (sealant layer 16b) were the propylene-based branched polymer-containing layers.

Example 20

A packaging material of Example 20 was prepared in the same manner as in Example 1 except that the resin used for forming the AL side layer (sealant layer 16a) was changed to a mixture of the resin A (resin composition β) and the branched polymer C. The content of the branched polymer C in the AL side layer (sealant layer 16a) was 10 mass % relative to the total mass of the AL side layer (sealant layer 16a). In the present example, the AL side layer (sealant layer 16a) was the propylene-based branched polymer-containing layer.

Example 21

A packaging material of Example 21 was prepared in the same manner as in Example 1 except that the resin used for forming the AL side layer (sealant layer 16a) was changed to a mixture of the resin A (resin composition β) and the branched polymer C, and that the resin used for forming the innermost layer (sealant layer 16b) was changed to a mixture of the resin B (resin composition α) and the branched polymer C. The content of the branched polymer C in the AL side layer (sealant layer 16a) was 3 mass % relative to the total mass of the AL side layer (sealant layer 16a), and the content of the branched polymer C in the innermost layer (sealant layer 16b) was 6 mass % relative to the total mass of the innermost layer (sealant layer 16b). In the present example, the AL side layer (sealant layer 16a) and the innermost layer (sealant layer 16b) were the propylene-based branched polymer-containing layers.

Example 22

A packaging material of Example 22 was prepared in the same manner as in Example 1 except that the resin used for forming the AL side layer (sealant layer 16a) was changed to a mixture of the resin A (resin composition β) and the branched polymer D. The content of the branched polymer D in the AL side layer (sealant layer 16a) was 10 mass % relative to the total mass of the AL side layer (sealant layer 16a). In the present example, the AL side layer (sealant layer 16a) was the propylene-based branched polymer-containing layer.

Example 23

A packaging material of Example 21 was prepared in the same manner as in Example 1 except that the resin used for forming the AL side layer (sealant layer 16a) was changed to a mixture of the resin A (resin composition β) and the branched polymer D, and that the resin used for forming the innermost layer (sealant layer 16b) was changed to a mixture of the resin B (resin composition α) and the branched polymer D. The content of the branched polymer D in the AL side layer (sealant layer 16a) was 3 mass % relative to the total mass of the AL side layer (sealant layer 16a), and the content of the branched polymer D in the innermost layer (sealant layer 16b) was 6 mass % relative to the total mass of the innermost layer (sealant layer 16b). In the present example, the AL side layer (sealant layer 16a) and the innermost layer (sealant layer 16b) were the propylene-based branched polymer-containing layers.

Example 24

First, the first and second anticorrosion treatment layers were provided on the metal foil layer through the following procedure. That is, (CL-3) was applied to both surfaces of the metal foil layer by micro gravure coating at a dry coating weight of 30 mg/m2, followed by baking at 200° C. in a drying unit. Next, (CL-2) was applied to the obtained layer by micro gravure coating at a dry coating weight of 20 mg/m2, thereby forming a composite layer of (CL-3) and (CL-2) as first and second anticorrosion treatment layers. The composite layer developed corrosion prevention performance by compounding two materials (CL-3) and (CL-2). A packaging material was prepared in the same manner as in Example 3 except that a metal foil layer provided with the first and second anticorrosion treatment layers was used. In the present example, the AL side layer (sealant layer 16a) was the propylene-based branched polymer-containing layer.

Example 25

First, the first and second anticorrosion treatment layers were provided on the metal foil layer through the following procedure. That is, (CL-3) was applied to both surfaces of the metal foil layer by micro gravure coating at a dry coating weight of 30 mg/m2, followed by baking at 200° C. in a drying unit. Next, (CL-2) was applied to the obtained layer by micro gravure coating at a dry coating weight of 20 mg/m2, thereby forming a composite layer of (CL-3) and (CL-2) as first and second anticorrosion treatment layers. The composite layer developed corrosion prevention performance by compounding two materials (CL-3) and (CL-2). A packaging material was prepared in the same manner as in Example 10 except that a metal foil layer provided with the first and second anticorrosion treatment layers was used. In the present example, the AL side layer (sealant layer 16a) and the innermost layer (sealant layer 16b) were the propylene-based branched polymer-containing layers.

Example 26

First, the first and second anticorrosion treatment layers were provided on the metal foil layer through the following procedure. That is, (CL-3) was applied to both surfaces of the metal foil layer by micro gravure coating at a dry coating weight of 30 mg/m2, followed by baking at 200° C. in a drying unit, thereby forming first and second anticorrosion treatment layers. A packaging material was prepared in the same manner as in Example 3 except that a metal foil layer provided with the first and second anticorrosion treatment layers was used. In the present example, the AL side layer (sealant layer 16a) was the propylene-based branched polymer-containing layer.

Example 27

First, the first and second anticorrosion treatment layers were provided on the metal foil layer through the following procedure. That is, (CL-3) was applied to both surfaces of the metal foil layer by micro gravure coating at a dry coating weight of 30 mg/m2, followed by baking at 200° C. in a drying unit, thereby forming first and second anticorrosion treatment layers. A packaging material was prepared in the same manner as in Example 10 except that a metal foil layer provided with the first and second anticorrosion treatment layers was used. In the present example, the AL side layer (sealant layer 16a) and the innermost layer (sealant layer 16b) were the propylene-based branched polymer-containing layers.

Example 28

The first and second anticorrosion treatment layers were provided to the metal foil layer in the same manner as in Example 1. The first anticorrosion treatment layer side of the metal foil layer provided with the first and second anticorrosion treatment layers was dry-laminated to a substrate layer using a polyurethane-based adhesive (first adhesive layer). Next, the second anticorrosion treatment layer side of the metal foil layer provided with the first and second anticorrosion treatment layers was dry-laminated to the sealant layer 16 (the innermost layer) (having a thickness of 30 μm) using the adhesive A (second adhesive layer). A mixture of the resin B (base resin composition, resin composition α) and the branched polymer A was used for forming the innermost layer (sealant layer 16). The content of the branched polymer A in the innermost layer (sealant layer 16) was 2 mass % relative to the total mass of the innermost layer (sealant layer 16).

The laminate obtained in this way was aged at 40° C. for 4 days to prepare a packaging material of Example 28 (laminate of substrate layer/first adhesive layer/first anticorrosion treatment layer/metal foil layer/second anticorrosion treatment layer/second adhesive layer/innermost layer). In the present example, the innermost layer (sealant layer 16) was the propylene-based branched polymer-containing layer.

Example 29

A packaging material of Example 29 was prepared in the same manner as in Example 28 except that the content of the branched polymer A in the innermost layer (sealant layer 16) was 75 mass % relative to the total mass of the innermost layer (sealant layer 16). In the present example, the innermost layer (sealant layer 16) was the propylene-based branched polymer-containing layer.

Example 30

A packaging material of Example 30 was prepared in the same manner as in Example 28 except that the adhesive used for forming the second adhesive layer was changed to the adhesive B. In the present example, the innermost layer (sealant layer 16) was the propylene-based branched polymer-containing layer.

Comparative Example 1

A packaging material of Comparative Example 1 was prepared in the same manner as in Example 1 except that the branched polymer A was not used, i.e., the resin A was used for forming the AL side layer.

Main conditions of the examples and the comparative example are shown in Table 1.

TABLE 1

| | Anti-corrosion treatment layer | Second adhesive layer | Sealant layer | | | | | | Content of propylene-based branched polymer in sealant layer relative to total mass of the sealant layer |
| | | | Type of base resin composition and thickness of each layer | | | Type of propylene-based branched polymer and content of the branched polymer in each layer | | | |
| | | | AL side layer | Intermediate layer | Innermost layer | AL side layer | Intermediate layer | Innermost layer | |
| --- | --- | --- | --- | --- | --- | --- | --- | --- | --- |
| Example 1 | (CL-1) + (CL-2) | — | Resin A (10 μm) | — | Resin B (20 μm) | Branched polymer A (1 mass %) | — | — | 0.3 mass % |
| Example 2 | (CL-1) + (CL-2) | — | Resin A (10 μm) | — | Resin B (20 μm) | Branched polymer A (3 mass %) | — | — | 1.0 mass % |
| Example 3 | (CL-1) + (CL-2) | — | Resin A (10 μm) | — | Resin B (20 μm) | Branched polymer A (10 mass %) | — | — | 3.3 mass % |
| Example 4 | (CL-1) + (CL-2) | — | Resin A (10 μm) | — | Resin B (20 μm) | — | — | Branched polymer A (2 mass %) | 1.3 mass % |
| Example 5 | (CL-1) + (CL-2) | — | Resin A (10 μm) | — | Resin B (20 μm) | — | — | Branched polymer A (6 mass %) | 4.0 mass % |
| Example 6 | (CL-1) + (CL-2) | — | Resin A (10 μm) | — | Resin B (20 μm) | — | — | Branched polymer A (20 mass %) | 13.3 mass % |
| Example 7 | (CL-1) + (CL-2) | — | Resin A (10 μm) | — | Resin B (20 μm) | — | — | Branched polymer A (40 mass %) | 26.7 mass % |
| Example 8 | (CL-1) + (CL-2) | — | Resin A (10 μm) | — | Resin B (20 μm) | — | — | Branched polymer A (75 mass %) | 50.0 mass % |
| Example 9 | (CL-1) + (CL-2) | — | Resin A (10 μm) | — | Resin B (20 μm) | Branched polymer A (1 mass %) | — | Branched polymer A (2 mass %) | 1.7 mass % |
| Example. 10 | (CL-1) + (CL-2) | — | Resin A (10 μm) | — | Resin B (20 μm) | Branched polymer A (3 mass %) | — | Branched polymer A (6 mass %) | 5.0 mass % |
| Example. 11 | (CL-1) + (CL-2) | — | Resin A (10 μm) | — | Resin B (20 μm) | Branched polymer A (3 mass %) | — | Branched polymer A (20 mass %) | 14.3 mass % |
| Example. 12 | (CL-1) + (CL-2) | — | Resin A (10 μm) | — | Resin B (20 μm) | Branched polymer A (3 mass %) | — | Branched polymer A (40 mass %) | 27.7 mass % |
| Example. 13 | (CL-1) + (CL-2) | — | Resin A (10 μm) | — | Resin B (20 μm) | Branched polymer A (3 mass %) | — | Branched polymer A (75 mass %) | 51.0 mass % |
| Example. 14 | (CL-1) + (CL-2) | — | Resin A (10 μm) | Resin B (10 μm) | Resin B (10 μm) | — | Branched polymer A (6 mass %) | — | 2.0 mass % |
| Example. 15 | (CL-1) + (CL-2) | — | Resin A (10 μm) | Resin B (10 μm) | Resin B (10 μm) | Branched polymer A (3 mass %) | Branched polymer A (6 mass %) | — | 3.0 mass % |
| Example. 16 | (CL-1) + (CL-2) | — | Resin A (10 μm) | Resin B (10 μm) | Resin B (10 μm) | Branched polymer A (3 mass %) | — | Branched polymer A (6 mass %) | 5.0 mass % |
| Example. 17 | (CL-1) + (CL-2) | — | Resin A (10 μm) | — | Resin B (20 μm) | Branched polymer A (10 mass %) | — | — | 3.3 mass % |
| Example. 18 | (CL-1) + (CL-2) | — | Resin A (10 μm) | — | Resin B (20 μm) | Branched polymer B (10 mass %) | — | — | 3.3 mass % |

TABLE 1-continued

| | Anti-corrosion treatment layer | Second adhesive layer | Sealant layer | | | | | | Content of propylene-based branched polymer in sealant layer relative to total mass of the sealant layer |
|---|---|---|---|---|---|---|---|---|---|
| | | | Type of base resin composition and thickness of each layer | | | Type of propylene-based branched polymer and content of the branched polymer in each layer | | | |
| | | | AL side layer | Intermediate layer | Innermost layer | AL side layer | Intermediate layer | Innermost layer | |
| Example. 19 | (CL-1) + (CL-2) | — | Resin A (10 μm) | — | Resin B (20 μm) | Branched polymer B (3 mass %) | — | Branched polymer B (6 mass %) | 5.0 mass % |
| Example. 20 | (CL-1) + (CL-2) | — | Resin A (10 μm) | — | Resin B (20 μm) | Branched polymer C (10 mass %) | — | — | 3.3 mass % |
| Example. 21 | (CL-1) + (CL-2) | — | Resin A (10 μm) | — | Resin B (20 μm) | Branched polymer C (3 mass %) | — | Branched polymer C (6 mass %) | 5.0 mass % |
| Example. 22 | (CL-1) + (CL-2) | — | Resin A (10 μm) | — | Resin B (20 μm) | Branched polymer D (10 mass %) | — | — | 3.3 mass % |
| Example. 23 | (CL-1) + (CL-2) | — | Resin A (10 μm) | — | Resin B (20 μm) | Branched polymer D (3 mass %) | — | Branched polymer D (6 mass %) | 5.0 mass % |
| Example. 24 | (CL-1) + (CL-2) | — | Resin A (10 μm) | — | Resin B (20 μm) | Branched polymer A (10 mass %) | — | — | 3.3 mass % |
| Example. 25 | (CL-1) + (CL-2) | — | Resin A (10 μm) | — | Resin B (20 μm) | Branched polymer A (3 mass %) | — | Branched polymer A (6 mass %) | 5.0 mass % |
| Example. 26 | (CL-3) | — | Resin A (10 μm) | — | Resin B (20 μm) | Branched polymer A (10 mass %) | — | — | 3.3 mass % |
| Example. 27 | (CL-3) | — | Resin A (10 μm) | — | Resin B (20 μm) | Branched polymer A (3 mass %) | — | Branched polymer A (6 mass %) | 5.0 mass % |
| Example. 28 | (CL-1) + (CL-2) | Adhesive A | — | — | Resin B (30 μm) | — | — | Branched polymer A (2 mass %) | 2.0 mass % |
| Example. 29 | (CL-1) + (CL-2) | Adhesive A | — | — | Resin B (30 μm) | — | — | Branched polymer A (75 mass %) | 75.0 mass % |
| Example. 30 | (CL-1) + (CL-2) | Adhesive B | — | — | Resin B (30 μm) | — | — | Branched polymer A (2 mass %) | 2.0 mass % |
| Comparative Example. 1 | (CL-1) + (CL-2) | — | Resin A (10 μm) | — | Resin B (20 μm) | — | — | — | 0 mass % |

<Assessment>

The following assessment tests were conducted on the packaging materials obtained in the examples and comparative example.

(Lamination Strength in Electrolyte)

An electrolyte prepared by adding 1M of LiPF6 to a mixed solution of ethylene carbonate/diethyl carbonate/dimethyl carbonate=1/1/1 (mass ratio) was filled in a Teflon (registered trademark) vessel. Then, a sample of the packaging material cut to 15 mm×100 mm was placed in the vessel, and the vessel was sealed and stored at 85° C. for 24 hours. Then, after prewashing, lamination strength (T-peel strength) between the metal foil layer and the second adhesive layer or between the metal foil layer and the sealant layer was measured using a testing machine (manufactured by INSTRON). The test was conducted in accordance with JIS K6854 at 23° C. and in a 50% RH atmosphere at a peeling rate of 50 mm/min.

Based on the results, assessments were given by the following criteria.

A: Lamination strength of more than 7 N/15 mm

B: Lamination strength of 6 n/15 mm or more and 7 N/15 mm or less

C: Lamination strength of 5 N/15 mm or more and less than 6 N/15 mm

D: Lamination strength of less than 5 N/15 mm (Heat Sealing Strength Against Electrolyte)

Figure 4:
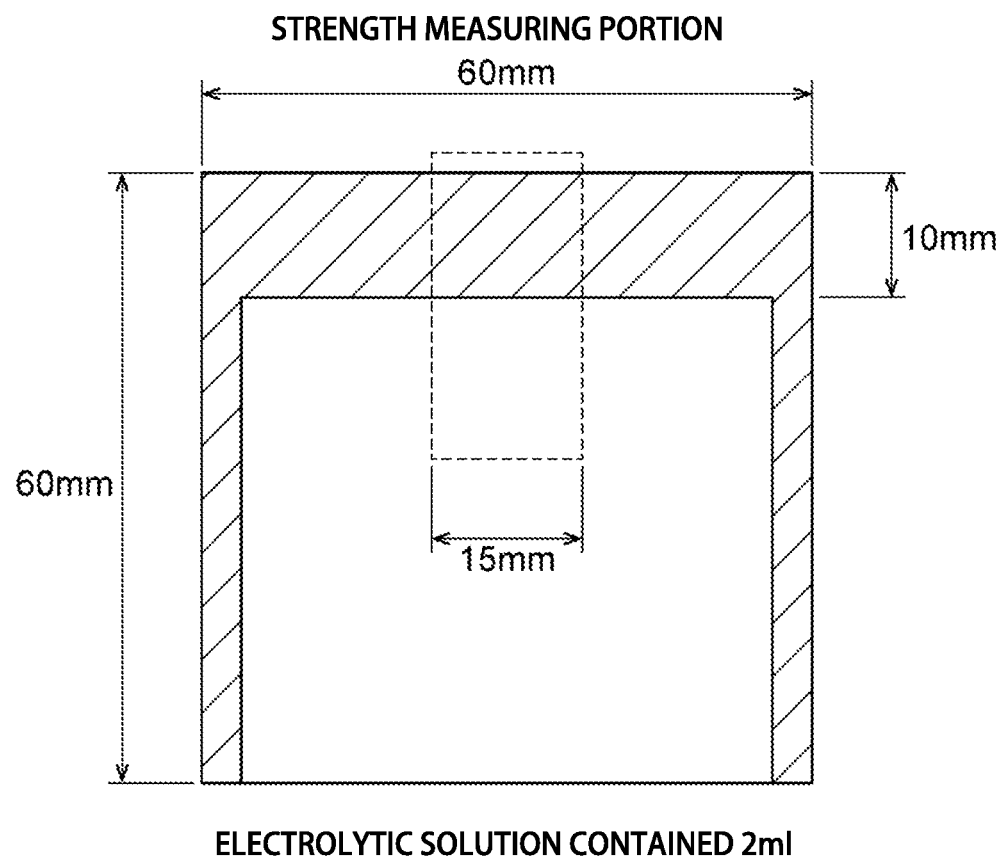
FIG. 4 is a schematic diagram illustrating a method of producing an assessment sample in an example.

A sample of the packaging material cut to 60 mm×120 mm was folded in half and heat-sealed at one side with a seal bar having a width of 10 mm at 190° C. and at 0.5 MPa, for 3 seconds. Then, the remaining two sides were heat-sealed so that the packaging material formed a pouch. An electrolyte was prepared by adding 1 M of LiPF6 to a mixed solution of ethylene carbonate/diethyl carbonate/dimethyl carbonate with a mass ratio of 1:1:1. The electrolyte in an amount of 2 ml was injected into the pouch and the pouch was stored at 60° C. for 24 hours. Then, the firstly heat-sealed side was cut to a 15-mm width (see FIG. 4) and the sealing strength (T-peel strength) was measured with a testing machine (manufactured by INSTRON). The test was conducted in accordance with JIS K6854 at 23° C. and in a 50% RH atmosphere at a peeling rate of 50 mm/min. Based on the results, assessments were given by the following criteria.

A: Sealing strength of 50 N/15 mm or more, and burst width of more than 5 mm

B: Sealing strength of 50 N/15 mm or more, and burst width of 3 mm to 5 mm

C: Sealing strength of 40 N/15 mm or more and less than 50 N/15 mm

D: Sealing strength of less than 40 N/15 mm (Degassing Heat Seal Strength)

A sample of the packaging material cut to 75 mm×150 mm was folded in half to 37.5 mm×150 mm (see FIG. 5A). Then, the 150 mm side and one of the 37.5 mm sides were heat-sealed to form a pouch. Then, an electrolyte was prepared by adding 1 M of LiPF6 to a mixed solution of ethylene carbonate/diethyl carbonate/dimethyl carbonate with a mass ratio of 1:1:1. The electrolyte in an amount of 5 ml was injected into the pouch and the other 37.5 mm side was heat-sealed and a pouch sealed by a sealing portion S1 was obtained. Next, the pouch was stored at 60° C. for 24 hours, and then the center portion of the pouch containing the electrolyte was heat-sealed at 190° C. and at 0.3 MPa, for 2 seconds (degassing heat-sealing portion S2, see FIG. 5B). To stabilize the sealing portion, the pouch was stored for 24 hours at room temperature. Then, a region including the degassing heat-sealing portion S2 was cut to a 15-mm width (see FIG. 5C), and the heat-sealing strength (T-peel strength) was measured using a testing machine (manufactured by INSTRON). The test was conducted in accordance with JIS K6854 at 23° C. and in a 50% RH atmosphere at a peeling rate of 50 mm/min.

Based on the results, assessments were given by the following criteria.

A: Sealing strength of 50 N/15 mm or more

B: Sealing strength of 35 N/15 mm or more and less than 50 N/15 mm

C: Sealing strength of 25 N/15 mm or more and less than 35 N/15 mm

D: Sealing strength of less than 25 N/15 mm (Blushing after Forming)

A sample of the packaging material in a normal state and a sample stored at 60° C. for one week were each cut to 120 mm×200 mm. Then, each of the cut samples was loaded on a cold forming die so that the sealant layer was in contact with the protrusion of the forming machine, followed by deep drawing of 2 mm at a forming rate of 5 mm/sec. Then, the side of the cut sample where stretching was the severest, due to the location near the film holding portion, was observed in terms of blushing. The die had a forming area of 80 mm×70 mm (square tube type) and a punch corner radius (RCP) of 1.0 mm. Based on the results, assessments were given by the following criteria. It can be said that there is no practical problem if the assessment is C or higher.

A: No blushing was observed in either of the normal state sample and the sample stored at 60° C. for 1 week B: No blushing was observed in the normal state sample, but slight blushing was observed in the sample stored at 60° C. for 1 week C: Slight blushing was observed in the normal state sample, and blushing was observed in the sample stored at 60° C. for 1 week D: Blushing in was observed in the normal state sample (Insulation Properties after Forming (Forming Insulation))

Figure 6A:
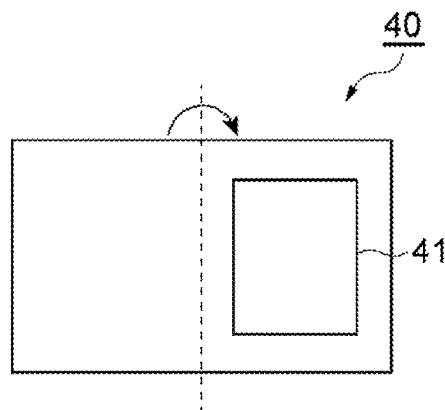
FIGS. 6A, 6B, 6C, 6D, 6E, and 6F are sets of schematic diagrams illustrating a method of producing an assessment sample in an example.
Figure 6B:
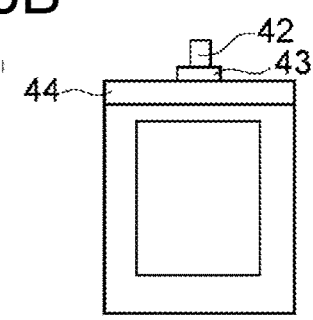
Figure 6C:
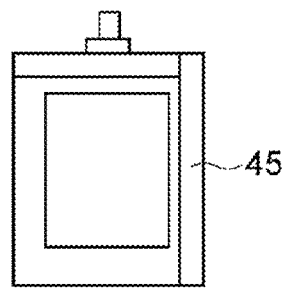
Figure 6D:
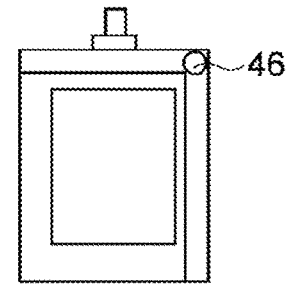
Figure 6E:
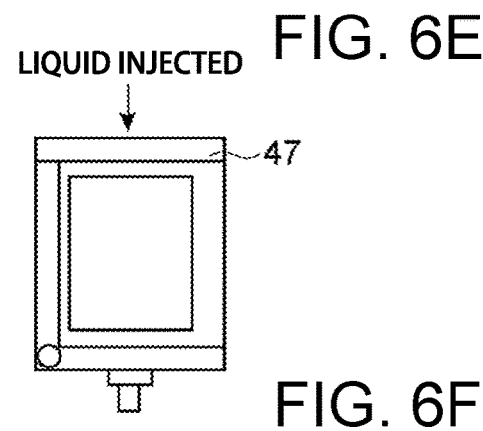
Figure 6F:
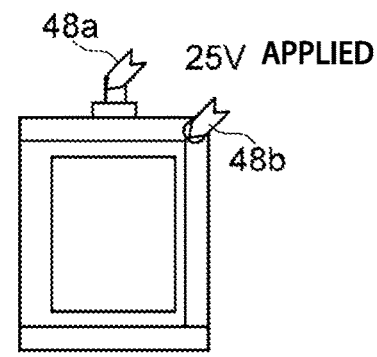

A sample 40 was prepared by cutting the packaging material to 120 mm×200 mm, and loaded on a cold forming die so that the sealant layer was in contact with the protrusion of the forming machine. Then, the sample 40 was deep-drawn to 2.0 mm at a forming rate of 15 mm/sec to form a deep-drawn portion 41. Then, the sample 40 was folded in half to 120 mm×100 mm (see FIG. 6A). Next, 100-mm upper edge portions 44, with a tab 42 and a tab sealant 43 sandwiched therebetween, were heat-sealed (see FIG. 6B). Then, 120-mm side edge portions 45 were heat-sealed to form a pouch (see FIG. 6C). Then, a portion of the outer layer of the sample 40 was scraped to form an exposed portion 46 for the metal foil layer so that electrodes could be brought into contact with the metal foil layer (see FIG. 6D). Then, 5 ml of an electrolyte prepared by adding 1 M of LiPF6 to a mixed solution of ethylene carbonate/diethyl carbonate/dimethyl carbonate with a mass ratio of 1:1:1 was injected into the pouch, and 100-mm lower edge portions 47 were heat-sealed (see FIG. 6E). Then, after storing the pouch in an oven at 60° C. for 1 week, electrodes 48a and 48b were respectively connected to the tab 42 and the exposed portion 46 of the metal foil layer, followed by applying 25 V using a withstand voltage/insulation resistance testing machine (TOS 9201 manufactured by KIKUSUI), and the resistance then was measured (see FIG. 6F). The die had a forming area of 80 mm×70 mm (square tube type) and a punch corner radius (RCP) of 1.0 mm. Based on the results, assessments were given by the following criteria.

A: Resistance was more than 200 MΩ

B: Resistance was 100 MΩ or more and less than 200 MΩ

C: Resistance was 30 MΩ or more and less than 100 MΩ

D: Resistance was less than 30 MΩ

(Insulation Properties after Degassing Heat Sealing (Degassing Insulation))

Figure 7C:
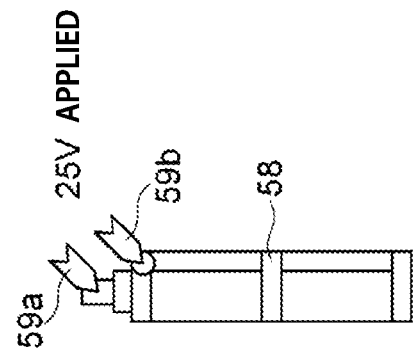
FIGS. 7A, 7B, 7C, 7D, 7E, and 7F are sets of schematic diagrams illustrating a method of producing an assessment sample in an example.
Figure 7F:
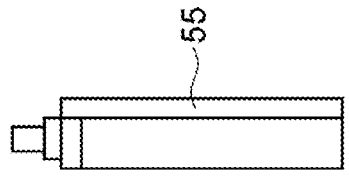
Figure 7B:
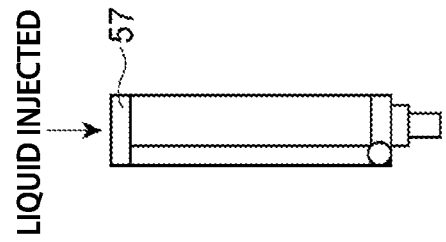
Figure 7E:
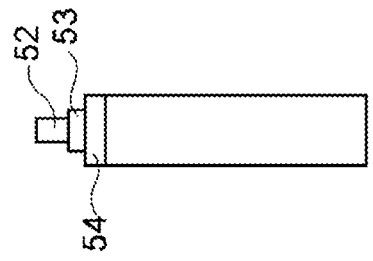
Figure 7A:
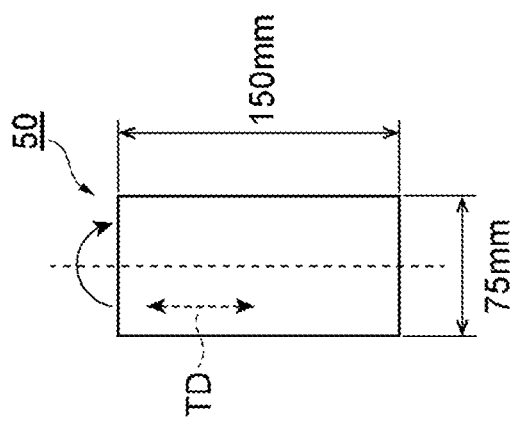
Figure 7D:
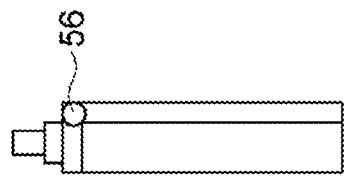

A sample 50 was prepared by cutting the packaging material to 75 mm×150 mm, and folded in half to 37.5 mm×150 mm (see FIG. 7A). Then, 37.5-mm upper edge portions 54 were heat-sealed, with a tab 52 and a tab sealant 53 sandwiched therebetween (see FIG. 7B). Then, 150-mm side edge portions 55 were heat-sealed to form a pouch (see FIG. 7C). Then, a portion of the outer layer of the sample 50 was scraped to form an exposed portion 56 for the metal foil layer so that electrodes could be brought into contact with the metal foil layer (see FIG. 7D). Then, 5 ml of an electrolyte prepared by adding 1 M of LiPF6 to a mixed solution of ethylene carbonate/diethyl carbonate/dimethyl carbonate with a mass ratio of 1:1:1 was injected into the pouch, and 37.5-mm lower edge portions 57 were heat-sealed (see FIG. 7E). Then, the pouch was left in a flat state at 60° C. for 24 hours, and then the center portion 58 of the pouch containing the electrolyte was degassing heat-sealed at 190° C. and at 0.3 MPa (surface pressure), for 2 seconds. Then, electrodes 59a and 59b were respectively connected to the tab 52 and the exposed portion 56 of the metal foil layer, followed by applying 25 V using a withstand voltage/insulation resistance testing machine (TOS 9201 manufactured by KIKUSUI), and the resistance then was measured (see FIG. 7F). Based on the results, assessments were given by the following criteria.

A: Resistance was more than 200 MΩ

B: Resistance was 100 MΩ or more and less than 200 MΩ

C: Resistance was 30 MΩ or more and less than 100 MΩ

D: Resistance was less than 30 MΩ

(Overall Quality)

Assessments are shown in Table 2. In Table 2 below, assessments without a D assessment can be regarded as having good overall quality.

TABLE 2

| | Electrolyte laminating strength | Electrolyte heat sealing strength | Degassing heat-sealing strength | Blushing | Forming insulation | Degassing insulation |
|---|---|---|---|---|---|---|
| Example 1 | A | A | A | A | B | C |
| Example 2 | A | A | A | A | B | B |
| Example 3 | A | A | A | A | A | A |
| Example 4 | A | A | A | A | B | C |
| Example 5 | A | A | A | A | B | B |
| Example 6 | A | A | A | A | B | B |
| Example 7 | A | A | A | A | B | B |
| Example 8 | A | A | A | A | B | B |
| Example 9 | A | A | A | A | B | B |
| Example 10 | A | A | A | A | B | B |
| Example 11 | A | A | A | A | A | A |
| Example 12 | A | A | A | A | A | A |
| Example 13 | A | B | B | B | B | B |
| Example 14 | A | A | A | A | B | B |
| Example 15 | A | A | A | A | B | B |
| Example 16 | A | A | A | A | B | B |
| Example 17 | B | B | B | A | B | B |
| Example 18 | A | A | A | A | A | A |
| Example 19 | A | A | A | A | B | B |
| Example 20 | B | B | B | C | A | A |
| Example 21 | B | B | B | C | B | B |
| Example 22 | B | A | A | C | B | B |
| Example 23 | B | A | A | C | B | B |
| Example 24 | B | B | B | A | B | B |
| Example 25 | B | B | B | A | B | B |
| Example 26 | C | C | B | A | B | B |
| Example 27 | C | C | B | A | B | B |
| Example 28 | A | A | A | A | A | A |
| Example 29 | A | A | A | B | A | A |
| Example 30 | C | C | C | A | A | A |
| Comparative Example 1 | A | A | A | A | B | D |

As is evident from the results shown in Table 2, it was confirmed that the packaging materials of Examples 1 to 30 had good insulation properties after degassing heat sealing. Furthermore, it was also confirmed that the packaging materials of Examples 1 to 30 had good performance in terms of electrolyte lamination strength, electrolyte heat sealing strength, degassing heat seal strength, and blushing, and that the packaging materials had good insulation properties after forming.

REFERENCE SIGNS LIST 10, 20, 30 . . . Power storage device packaging material; 11 . . . Substrate layer; 12 . . . First adhesive layer; 13 . . . Metal foil layer; 14 . . . Anticorrosion treatment layer; 16 . . . Sealant layer; 16a . . . First sealant layer; 16b . . . Second sealant layer; 16c . . . Third sealant layer; 17 . . . Second adhesive layer; 40 . . . Sample; 41 . . . Deep-drawn portion; 42 . . . Tab; 43 . . . Tab sealant; 44 . . . Upper edge portion; 45 . . . Side edge portion; 46 . . . Exposed portion of metal foil layer; 47 . . . Lower edge portion; 48a, 48b . . . Electrode; 50 . . . Sample; 52 . . . Tab; 53 . . . Tab sealant; 54 . . . Upper edge portion; 55 . . . Side edge portion; 56 . . . Exposed portion of metal foil layer; 57 . . . Lower edge portion; 58 . . . Central portion; 59a, 59b . . . Electrode; S1 . . . Sealing portion; S2 . . . Degassing heat-sealing portion.

What is claimed is:

1. A power storage device packaging material, comprising:
 a substrate layer, which is a polyamide film,
 an aluminum foil layer having an anticorrosion treatment layer on both sides thereof, and a sealant layer in this order,
 wherein the sealant layer is in direct physical contact with the anticorrosion treatment layer on the aluminum foil layer;
 the sealant layer includes a propylene-based branched polymer-containing layer that consists of (a) a propylene-based branched polymer having branched chains and (b) a first base resin composition consisting of (AR-1) a random polypropylene based acid-modified polypropylene resin composition and (AR-2) a propylene-α-olefin copolymer having an atactic structure, wherein a ratio of (AR-1) to (AR-2) is 75:25,
 wherein the propylene-based branched polymer does not have a crosslinked structure, wherein the propylene-based branched polymer is selected from the group consisting of:
 (A) a propylene-ethylene random copolymer with branched chains having 500 or more carbons;
 (B) a propylene-1-butene copolymer with branched chains having 500 or more carbons;
 (C) a homopolypropylene with branched chains having 500 or more carbons; and
 (D) a block polypropylene with branched chains having 500 or more carbons;
 wherein the substrate layer is an outermost layer of the power storage device packaging material and the sealant layer is an innermost layer of the power storage device packaging material; and
 wherein the sealant layer consists of the propylene-based branched polymer-containing layer and a second layer, the propylene-based branched polymer-containing layer is in direct physical contact with the anticorrosion treatment layer on the aluminum foil layer, wherein a mass content of the propylene-based branched polymer in the propylene-based branched polymer-containing layer is from 1 mass % to 10 mass %, the second layer of the sealant layer comprises a second resin composition prepared by mixing (A-1) a propylene-ethylene random copolymer having a melting temperature from 125° C. to 140° C., (B-1) a propylene-1-butene random copolymer elastomer having a melting temperature from 65° C. to 90° C. and (B-2) an ethylene-1-butene random copolymer elastomer having a melting temperature from 65° C. to 90° C. at a mass ratio of (A-1):(B-1):(B-2)=70:20:10; and the anticorrosion treatment layer comprises sodium polyphosphate stabilized cerium oxide sol having a solid content concentration of 10 mass % and a mixture of 90 mass % of polyallylamine and 10 mass % of polyglycerol polyglycidyl ether, wherein the mixture has a solid concentration of 5 mass %.

2. The power storage device packaging material of claim 1, wherein the propylene-based branched polymer is the propylene-ethylene random copolymer with branched chains having 500 or more carbons.

3. The power storage device packaging material of claim 1, wherein the propylene-based branched polymer is the propylene-1-butene copolymer with branched chains having 500 or more carbons.

4. The power storage device packaging material of claim 1, wherein the propylene-based branched polymer is the homopolypropylene with branched chains having 500 or more carbons.

5. The power storage device packaging material of claim 1, wherein the propylene-based branched polymer is the block polypropylene with branched chains having 500 or more carbons.

6. The power storage device packaging material of claim 1, wherein the second layer of the sealant layer consists of the second resin composition.

7. The power storage device packaging material of claim 1, wherein the second layer of the sealant layer further comprises 2 mass % to 75 mass % of a second propylene-based branched polymer selected from the group consisting of:
(A) a propylene-ethylene random copolymer with branched chains having 500 or more carbons;
(B) a propylene-1-butene copolymer with branched chains having 500 or more carbons;
(C) a homopolypropylene with branched chains having 500 or more carbons; and
(D) a block polypropylene with branched chains having 500 or more carbons.

8. A power storage device packaging material, comprising:
a substrate layer, which is a polyamide film,
an aluminum foil layer having an anticorrosion treatment layer on both sides thereof, and a sealant layer in this order,
wherein the sealant layer is in direct physical contact with the anticorrosion treatment layer on the aluminum foil layer;
the sealant layer includes a propylene-based branched polymer-containing layer that consists of (a) a propylene-based branched polymer having branched chains and (b) a first base resin composition consisting of (AR-1) a random polypropylene based acid-modified polypropylene resin composition and (AR-2) a propylene-α-olefin copolymer having an atactic structure, wherein a ratio of (AR-1) to (AR-2) is 75:25,
wherein the propylene-based branched polymer does not have a crosslinked structure, wherein the propylene-based branched polymer is selected from the group consisting of:
(A) a propylene-ethylene random copolymer with branched chains having 500 or more carbons;
(B) a propylene-1-butene copolymer with branched chains having 500 or more carbons;
(C) a homopolypropylene with branched chains having 500 or more carbons; and
(D) a block polypropylene with branched chains having 500 or more carbons;
wherein the substrate layer is an outermost layer of the power storage device packaging material and the sealant layer is an innermost layer of the power storage device packaging material; and
wherein the sealant layer consists of the propylene-based branched polymer-containing layer, a third layer and a second layer between the propylene-based branched polymer-containing layer and the third layer; the propylene-based branched polymer-containing layer is in direct physical contact with the anticorrosion treatment layer on the aluminum foil layer, wherein a mass content of the propylene-based branched polymer in the propylene-based branched polymer-containing layer is from 1 mass % to 10 mass %, each of the second layer and the third layer of the sealant layer comprises a second resin composition prepared by mixing (A-1) a propylene-ethylene random copolymer having a melting temperature from 125° C. to 140° C., (B-1) a propylene-1-butene random copolymer elastomer having a melting temperature from 65° C. to 90° C. and (B-2) an ethylene-1-butene random copolymer elastomer having a melting temperature from 65° C. to 90° C. at a mass ratio of (A-1):(B-1):(B-2)=70:20:10; one of the second layer and the third layer of the sealant layer further comprises a second propylene-based branched polymer selected from the group consisting of:
(A) a propylene-ethylene random copolymer with branched chains having 500 or more carbons;
(B) a propylene-1-butene copolymer with branched chains having 500 or more carbons;
(C) a homopolypropylene with branched chains having 500 or more carbons; and
(D) a block polypropylene with branched chains having 500 or more carbons;
the other of the second layer and the third layer of the sealant layer consists of the second resin composition and the anticorrosion treatment layer comprises sodium polyphosphate stabilized cerium oxide sol having a solid content concentration of 10 mass %, and a mixture of 90 mass % of polyallylamine and 10 mass % of polyglycerol polyglycidyl ether, wherein the mixture has a solid concentration of 5 mass %.

9. The power storage device packaging material of claim 8, wherein the second layer of the sealant layer consists of the second resin composition and the third layer of the sealant layer further comprises 6 mass % of the propylene-ethylene random copolymer with branched chains having 500 or more carbons.

10. The power storage device packaging material of claim 8, wherein the third layer of the sealant layer consists of the second resin composition and the second layer of the sealant layer further comprises 6 mass % of the propylene-ethylene random copolymer with branched chains having 500 or more carbons.

* * * * *